(12) United States Patent
Morioka et al.

(10) Patent No.: US 7,246,363 B2
(45) Date of Patent: Jul. 17, 2007

(54) DISK CHANGER HAVING PROVISION FOR VISIBILITY OF STORED DISK

(75) Inventors: Yukio Morioka, Katano (JP); Jun Kitamura, Hirakata (JP); Masahiko Nakamura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 115 days.

(21) Appl. No.: 10/372,936

(22) Filed: Feb. 26, 2003

(65) Prior Publication Data

US 2003/0161225 A1    Aug. 28, 2003

(30) Foreign Application Priority Data

Feb. 27, 2002  (JP)  ............................. 2002-050583
Feb. 27, 2002  (JP)  ............................. 2002-050584

(51) Int. Cl.
    *G11B 17/03*    (2006.01)
(52) U.S. Cl. ...................................... 720/614
(58) Field of Classification Search ................. 720/614
    See application file for complete search history.

(56) References Cited

U.S. PATENT DOCUMENTS

| 5,327,412 | A | * | 7/1994 | Lee ............................. 720/614 |
| 5,524,002 | A | * | 6/1996 | Morita et al. ................ 720/614 |
| 5,844,880 | A | * | 12/1998 | Motoki et al. ............... 720/614 |
| 5,878,016 | A |   | 3/1999 | Kubokawa et al. .......... 369/178 |
| 5,970,036 | A | * | 10/1999 | Matsugase ................... 720/614 |
| 6,301,219 | B1 |  | 10/2001 | Kondo et al. ................ 369/191 |
| 6,728,168 | B2 | * | 4/2004 | Kido ........................... 369/30.9 |

FOREIGN PATENT DOCUMENTS

| EP | 0 905 686 |   | 3/1999 |
| JP | 04205755 | A * | 7/1992 |
| JP | 6-231526 |   | 8/1994 |
| JP | 10-116465 |  | 5/1998 |
| JP | 10-228710 |  | 8/1998 |
| JP | 11-203764 |  | 7/1999 |
| JP | 2001-084679 | | 3/2001 |
| JP | 2003-016719 | | 1/2003 |

* cited by examiner

*Primary Examiner*—David Davis
(74) *Attorney, Agent, or Firm*—Steptoe & Johnson LLP

(57) ABSTRACT

With a conventional disk changer, it takes a long time with poor operability to directly and visually confirm which tray has a disk or which tray has which disk in a device. A disk changer of the invention includes a tray transfer unit for shuttling trays between a standby position and an attaching/detaching position and between the standby position and a recording/reproducing position, a tray gear unit engaged separately with the trays, and a tray driving unit for driving the trays separately via the tray gear unit, so that the trays can be separately moved from the standby position to the attaching/detaching position via the tray gear unit and the trays can be protruded to the attaching/detaching position while being arranged like steps. Hence, it is possible to directly and visually confirm which tray has a disk or which tray has which disk in a device with a simple operation in a short time.

10 Claims, 25 Drawing Sheets

FIG. 8
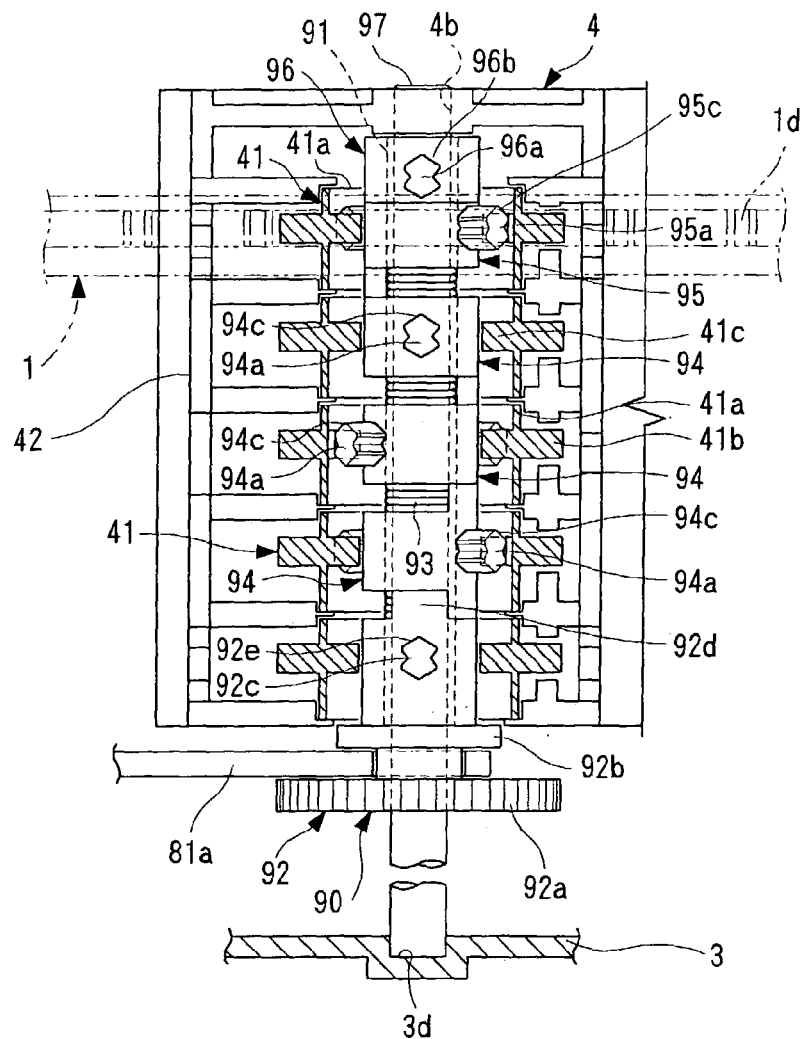
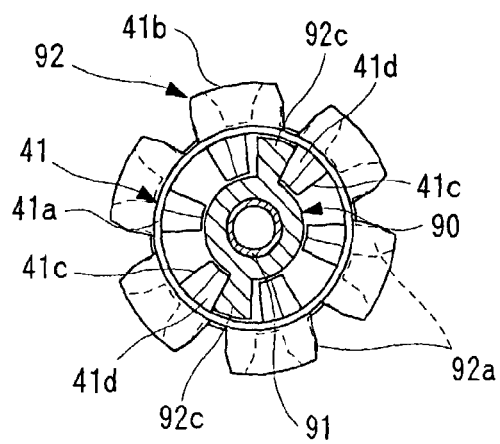
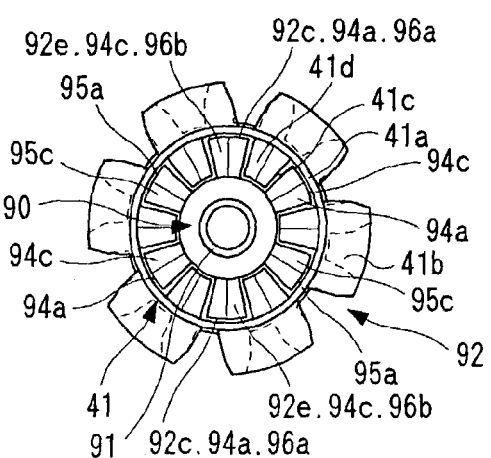
FIG. 9 (a)      FIG. 9 (b)

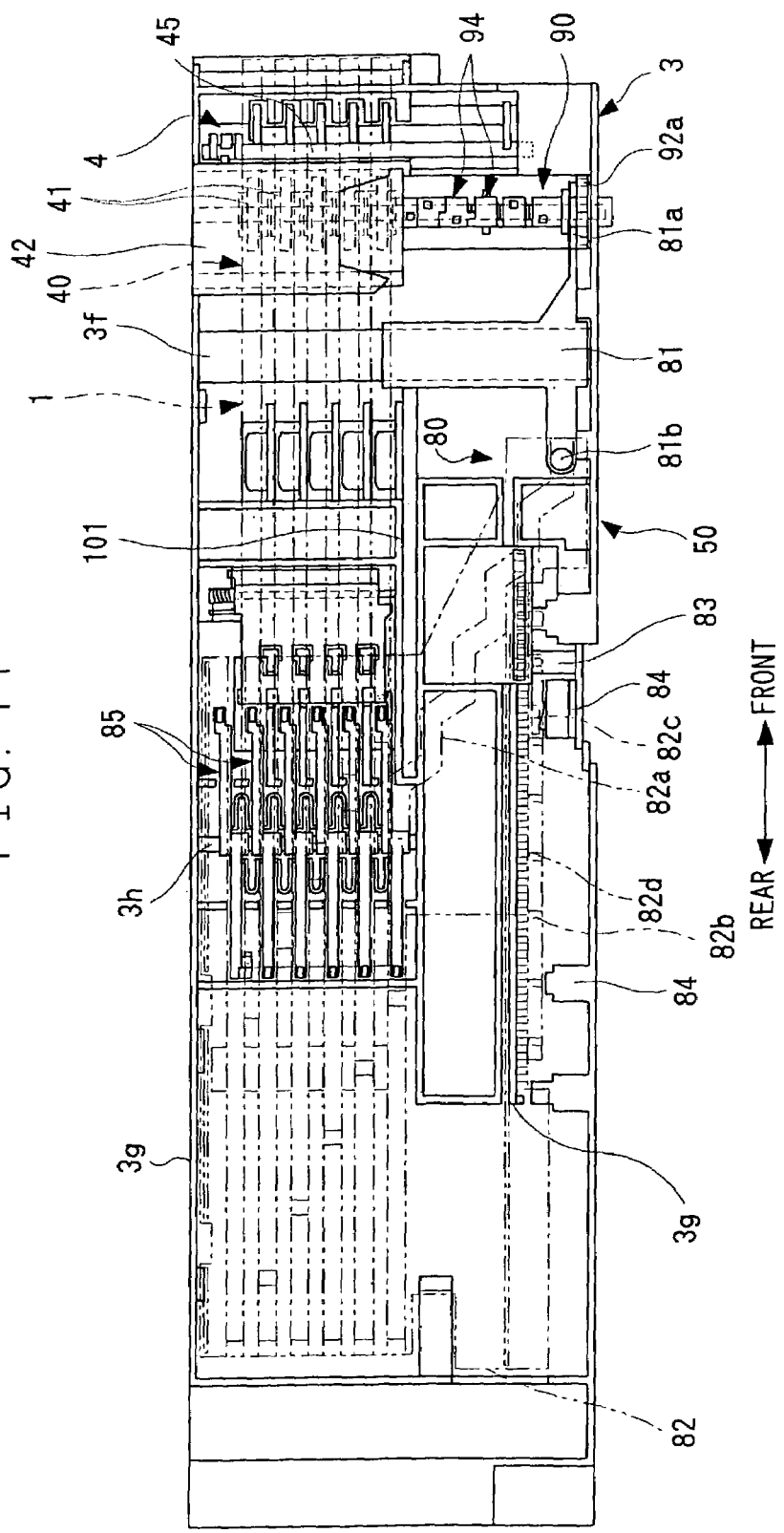

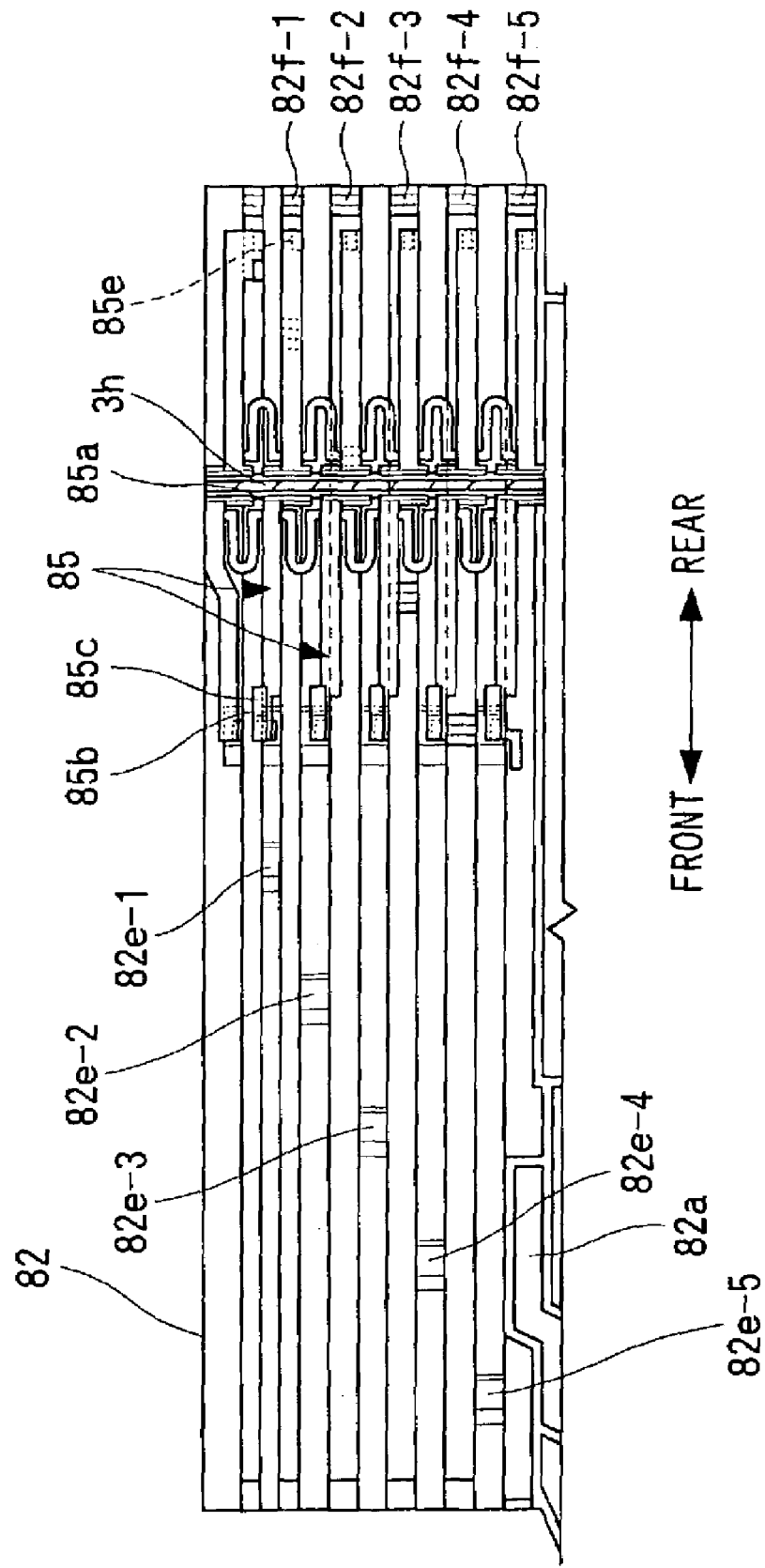

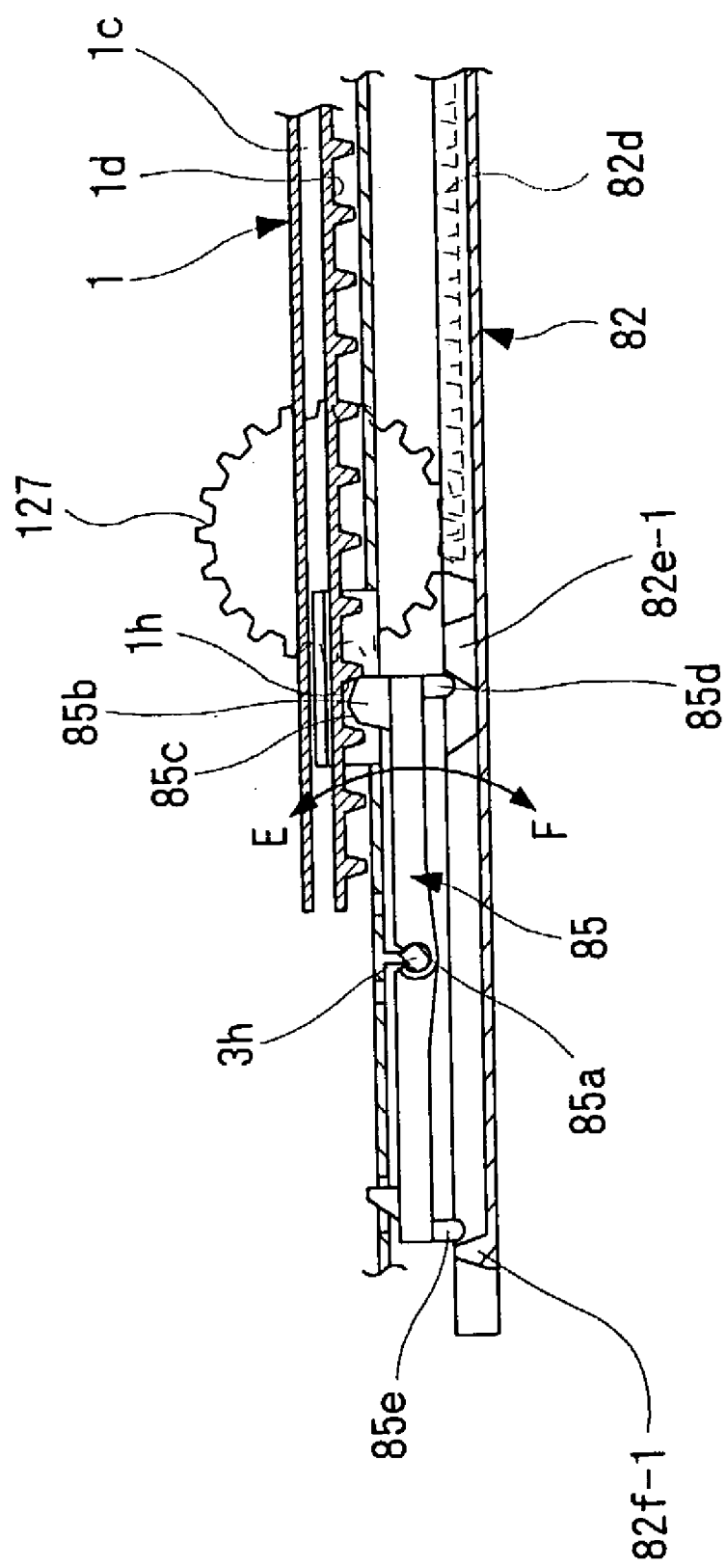

DISK CHANGER HAVING PROVISION FOR VISIBILITY OF STORED DISK

FIELD OF THE INVENTION

The present invention relates to a disk changer which stores a plurality of disks in a device, transports a disk selected from the plurality of disks, and performs recording and reproduction of the disk.

BACKGROUND OF THE INVENTION

Conventionally, a disk changer disclosed in Japanese Unexamined Patent Publication No. 7-282520 has been known.

In the conventional configuration, a plurality of trays including a sub tray for loading a disk and a main tray for movably holding the sub tray are stacked in a vertical direction. Further, a tray moving mechanism is provided in which specified main tray and sub tray are selected and moved by vertical movement.

With the tray moving mechanism, the main tray is moved between an exchanging position where the main tray is, protruded to the outside of a device together with the sub tray to exchange a disk and a standby position where a disk is stored in the device. By connecting and disconnecting engagement with the main tray, the sub tray is moved between the standby position and a reproducing position where a disk is recorded and reproduced by a reproducing mechanism provided in the device. The reproducing mechanism can move vertically in accordance with a vertical position of a selected disk.

Then, an instruction is provided to exchange a disk by moving a selected main tray to the exchanging position by using a tray moving mechanism. Thereafter, the main tray is returned to the standby position in the device and a disk is stored. Next, recording and reproduction of a disk are performed as follows: the reproducing mechanism is vertically moved and is aligned with a vertical position of a selected disk, and a selected sub tray is moved from the standby position to the reproducing position by the tray moving mechanism together with the disk.

However, in the conventional disk changer, in order to directly and visually confirm which tray has a disk or which tray has which disk in the device, the operation of "moving a selected tray from the standby position to the exchanging position for confirmation and thereafter moving the tray from the exchanging position to the standby position" needs to be performed on all the trays in turn, resulting in a time-consuming operation and poor operability.

DISCLOSURE OF THE INVENTION

The present invention has an object to provide a disk changer with which it is possible to directly and visually confirm which tray has a disk or which tray has which disk in a device with a simple operation in a short time.

In order to attain the above object, a disk changer of the first invention stores a plurality of disks, transports a disk selected from the plurality of disks, and performs recording and reproduction of the disk, the disk changer comprising a plurality of trays which are respectively loaded with the disks, can be moved substantially in a horizontal direction being in parallel with the main surface of the disk, and are stacked substantially in a vertical direction at a right angle to the main surface of the disk, a disk recording/reproducing section for holding the disk on a turntable and performing recording or reproduction, and a tray transfer unit for shuttling the trays between a standby position for storing the disks in a device and an attaching/detaching position for protruding the trays to the outside of the device to attach and detach the disks and between the standby position and a recording/reproducing position for recording and reproducing the disks. The tray transfer unit can be switched to an operation for separately moving the trays from the standby position to the attaching/detaching position and an operation for moving all the trays from the standby position to the attaching/detaching position and arranging the trays like steps at the attaching/detaching position.

According to the configuration of the first invention, the tray transfer unit is switched to a separately-moving operation and is driven, so that the trays are separately moved from the standby position to the attaching/detaching position. Further, the tray transfer unit is switched to an all-at-once operation and is driven, and the trays are arranged like steps, that is, the trays can be protruded to the attaching/detaching position while the main surfaces of all the disks are partially exposed. Thus, it is possible to obtain an advantageous effect of directly and visually confirming which tray has the disk or which tray has which disk in the device with a simple operation in a short time.

Further, a disk changer of the second invention stores a plurality of disks, transports a disk selected from the plurality of disks, and performs recording and reproduction of the disk, the disk changer comprising a plurality of trays which are respectively loaded with the disks, can be moved substantially in a horizontal direction being in parallel with the main surface of the disk, and are stacked substantially in a vertical direction at a right angle to the main surface of the disk, a disk recording/reproducing section for holding the disk on a turntable and performing recording or reproduction, and a tray transfer unit for shuttling the trays between a standby position for storing the disks in a device and an attaching/detaching position for protruding the trays to the outside of the device to attach and detach the disks and between the standby position and a recording/reproducing position for recording and reproducing the disks. The tray transfer unit can be switched to an operation for separately moving the trays from the standby position to the attaching/detaching position and an operation for moving all the trays other than the recorded or reproduced tray from the standby position to the attaching/detaching position and arranging the trays like steps at the attaching/detaching position.

According to the configuration of the second invention, the tray transfer unit is switched to a separately-moving operation and is driven, so that the trays are separately moved from the standby position to the attaching/detaching position. Further, the tray transfer unit is switched to an all-at-once operation and is driven, so that the trays are arranged like steps, that is, the trays can be protruded to the attaching/detaching position while the main surfaces of all the disks are partially exposed. Thus, it is possible to obtain an advantageous effect of directly and visually confirming which tray has the disk or which tray has which disk in the device with a simple operation in a short time.

Further, a disk changer of the third invention stores a plurality of disks, transports a disk selected from the plurality of disks, and performs recording and reproduction of the disk, the disk changer comprising a plurality of trays which are respectively loaded with the disks, can be moved substantially in a horizontal direction being in parallel with the main surface of the disk, and are stacked substantially in a vertical direction at a right angle to the main surface of the disk, a disk recording/reproducing section for holding the disk on a turntable and performing recording or reproduction, and a tray transfer unit for shuttling the trays between a standby position for storing the disks in a device and an attaching/detaching position for protruding the trays to the outside of the device to attach and detach the disks and between the standby position and a recording/reproducing position for recording and reproducing the disks, an elevating unit for moving the disk recording/reproducing section substantially in a vertical direction and setting the section at a height of the selected disk, a tray selecting unit which is similarly moved substantially in a vertical direction and selects a tray loaded with the selected disk, and a driving mechanism for driving the tray transfer unit, the elevating unit, and the tray selecting unit. The tray transfer unit comprises a tray gear unit separately engaged with the trays and a tray driving unit for separately driving the trays via the tray gear unit. The tray gear unit has a plurality of tray gears which are located uniaxially in a laminated manner so as to be engaged with the trays, respectively. The tray driving unit is located in a laminated manner uniaxially as the tray gears on the inner diameter part of the tray gears and has a plurality of tray driving cams respectively engaged with the tray gears. These tray driving cams have protrusions partially on contacted surfaces, and the protrusion successively drives the protrusion of the adjacent tray driving cam in an intermittent manner.

According to the configuration of the third invention, by driving the tray driving unit serving as the tray transfer unit, the trays 1 are separately moved from the standby position to the attaching/detaching position via the tray gear unit separately engaged with the trays. Further, when the tray driving cam on the first stage, which is the lowest stage, is rotated among the plurality of tray driving cams located in a laminated manner, only the engaged tray gear on the first stage is rotated, and the only the tray on the first stage that is engaged with the tray gear starts moving from the standby position to the attaching/detaching position. Then, when the tray driving cam on the first stage rotates one angle, the protrusions provided on a part of the contacted surfaces of the tray driving cam drive the protrusions of the adjacent tray driving cam. Thus, the tray driving cam on the second stage is rotated subsequently, the engaged tray gear on the second stage is rotated, and the tray on the second stage that is engaged with the tray gear also starts moving from the standby position to the attaching/detaching position. Subsequently, when the tray driving cam on the second stage rotates one angle, the tray driving cam on the third stage and the tray gear on the third stage are similarly rotated, and the tray on the third stage also starts moving from the standby position to the detaching position.

Thereafter, all the trays 1 are similarly moved to the standby position. At this point, the tray 1 on the second stage starts the movement after the tray on the first stage and the tray on the third stage starts the movement after the tray 1 on the second stage. Thus, the trays are arranged like steps, that is, the trays are protruded to the attaching/detaching position while the main surfaces of all the disks are partially exposed. Hence, with a simple operation in a short time, it is possible to directly and visually confirm which tray has the disk or which tray has which disk.

In a first preferred embodiment of the disk changer of the third invention, cams are provided on the inner diameter parts of tray gears in the tray gear unit, driving cams are provided on the outer diameter parts of the tray driving cam in the tray driving unit, and the cams can be engaged with the driving cams.

According to the first embodiment of the third invention, rotational drive can be transmitted by engaging the cams of the tray gears and the driving cams of the tray driving cams.

In a second preferred embodiment of the disk changer of the third invention, protruded portions and recessed portions are formed on the cams and driving cams with respect to the rotating direction.

According to the second embodiment of the third invention, even when the cams of the tray gears and the driving cams of the tray driving cams are slightly deviated in height from each other, induced correction can be made by the protruded portions and the recessed portions, thereby transmitting rotational drive with stability.

In a third preferred embodiment of the disk changer of the third invention, lamination is provided such that an interval between a driving cam on the highest stage or the lowest stage and a driving cam on the subsequent stage is smaller than an interval between the other driving cams, so that when the driving cam on the highest stage or the lowest stage is engaged with the tray driving cam, the other driving cams are not engaged with the other tray driving cams.

According to the third embodiment of the third invention, the common tray driving unit is used to selectively perform the operation of protruding the trays separately (one by one) to the attaching/detaching position and the operation of protruding all the trays (plural), which are arranged like steps, to the attaching/detaching position. Additionally, even in a state in which a disk on one tray is held on a turntable and recording or reproduction is performed, except for the recorded or reproduced disks and tray, the trays are arranged like steps, that is, the trays are protruded to the attaching/detaching position while the main surfaces of all the disks are partially exposed. Without interrupting recording or reproduction on the disks, it is, possible to directly and visually confirm which tray has the disk or which tray has which disk in the device with a simple operation in a short time.

In a fourth preferred embodiment of the disk changer of the third invention, the driving mechanism comprises a horizontal motor for driving the tray transfer unit and an elevation driving motor for driving the elevating unit and the tray selecting unit, a connecting/disconnecting unit is provided for connecting and disconnecting transmission in a transmission line from the elevation driving motor to the elevating unit, and the connecting/disconnecting unit is driven by a switching lever which operates in response to the rotation of a main gear interlocked with the horizontal drive motor.

According to the fourth embodiment of the third invention, when disks are stored in the device and are located on the standby position, the connecting/disconnecting unit is brought into a connecting state by the switching lever which operates in response to the rotation of the main gear interlocked with the horizontal drive motor serving as the tray transfer unit. Hence, when the elevation driving motor is driven, since the elevating unit and the tray selecting unit are driven at the same time, it is possible to simultaneously move the disk recording/reproducing section vertically and to select the tray. Thereafter, the horizontal drive motor is driven to drive the tray transfer unit, so that trays are shuttled between the standby position and the attaching/detaching position and between the standby position and the recording/reproducing position, and it is possible to load or eject the disks and exchange the recorded and reproduced disks.

Further, when the disks are located on the recording/reproducing position where the disks are held on the turntable for recording and reproduction, the connecting/disconnecting unit is brought into a disconnecting state by the switching lever which operates in response to the rotation of the main gear interlocked with the horizontal drive motor serving as the tray transfer unit. Hence, when the elevation driving motor is driven, although the tray selecting unit is driven to select the tray, the elevating unit is not driven, the disk recording/reproducing section is held at the same position without moving vertically, and thus recording or reproduction can be continued. In this state, the horizontal motor is driven to drive the tray transfer unit and the trays are shuttled between the standby position and the attaching/detaching position. Hence, without interrupting the recording or reproduction of the disks, it is possible to load or eject the disks on the trays other than the recorded or reproduced tray. As described above, with a simple configuration and a stable operation, the tray transfer unit, the elevating unit, and the tray selecting unit can be operated in a short time.

In a fifth preferred embodiment of the disk changer of the third invention, the connecting/disconnecting unit comprises the Geneva gear which is constantly interlocked with the elevating unit and the switching gear which is constantly interlocked with the elevation driving motor, and the switching gear disconnects engagement with the Geneva gear by using the switching lever.

According to the fifth embodiment of the third invention, since it is possible to disconnect engagement of the switching gear with the Geneva gear via the switching lever which operates in response to the rotation of the main gear serving as the tray transfer unit, thereby readily performing the disconnecting operation of the connecting/disconnecting unit with stability in a short time.

In a sixth preferred embodiment of the disk changer of the third invention, the connecting/disconnecting unit disconnects engagement with cam grooves formed on the Geneva gear by vertically disengaging a driving pin provided on the switching gear.

According to the sixth embodiment of the third invention, when the switching gear serving as the connecting/disconnecting unit is moved vertically by the switching lever which operates in response to the rotation of the main gear, gaps are formed between the cylindrical part of the switching gear and the circular arc cam of the Geneva gear, and the switching gear and the Geneva gear do not interfere with each other horizontally. Thus, the switching gear can positively move in a vertical direction. Moreover, when the connecting/disconnecting unit is in the connecting state, by rotating the switching gear, the driving pin of the switching gear is engaged with the cam grooves of the Geneva gear to drive the Geneva gear and rotate the Geneva gear intermittently. Thus, it is possible to perform reliable driving and a stable disconnecting operation.

In a seventh preferred embodiment of the disk changer of the third invention, the connecting/disconnecting unit maintains the engagement between the circular arc cams of the Geneva gear and the cylindrical part of the switching gear even when the driving pin is engaged with the cam grooves and even when the driving pin is vertically disengaged and the engagement is disconnected.

According to the seventh embodiment of the third invention, when the operation is stopped, the engagement between the circular arc cams of the Geneva gear and the cylindrical part of the switching gear is constantly maintained. Hence, the Geneva gear is locked from the driven side so as not to be rotated. Thus, the elevating unit is locked so as not to be moved even when a transmission line to the elevation driving motor is disconnected. Since the elevating unit is not moved even when vibration or impact is applied from the outside, resulting in no deviation in height of the disk recording/reproducing section.

In an eighth preferred embodiment of the disk changer of the third invention, the cam groove has a chamfered part so as to increase in width as being closer to the end According to the eighth embodiment of the third invention, as compared with the absence of the chamfered part, it is possible to reduce a radius from the rotational center of the driving pin of the engaged switching gear. Hence, it is possible to lower a reduction ratio of the Geneva gear and the switching gear, to reduce fluctuations in load, and to reduce impact when the Geneva gear is rotated intermittently.

In a ninth preferred embodiment of the disk changer of the third invention, the circular arc cam is formed with its ends spreading wider than the arc.

According to the ninth embodiment of the third invention, as compared with the case where both ends of the circular arc cam do not spread wider than the arc, gaps are obtained between both ends of the circular arc cam of the Geneva gear and the cylindrical part of the switching gear. Thus, in the case where the switching gear serving as the connecting/disconnecting unit is vertically moved, even when the rotation stopping position of the switching gear is slightly shifted, the cylindrical part and the recessed portion of the switching gear and both ends of the circular arc cam of the Geneva gear do not interfere with each other.

BRIEF DESCRIPTION OF THE DRAWINGS

FIG. 8 is a sectional view taken along line Q—Q of FIG. 6;

FIGS. 9(a) and 9(b) are detail top views showing the positional relationship between the tray gear unit and the tray driving unit;

FIG. 11 is a left side view showing the detail of a tray selecting unit 80;

FIG. 12 is a left inside view showing a main part of FIG. 11;

FIG. 13 is a top view showing the main part of FIG. 11;

DESCRIPTION OF THE PREFERRED EMBODIMENTS

The following will discuss the embodiment of the present invention in accordance with the accompanied drawings.

Figure 1:
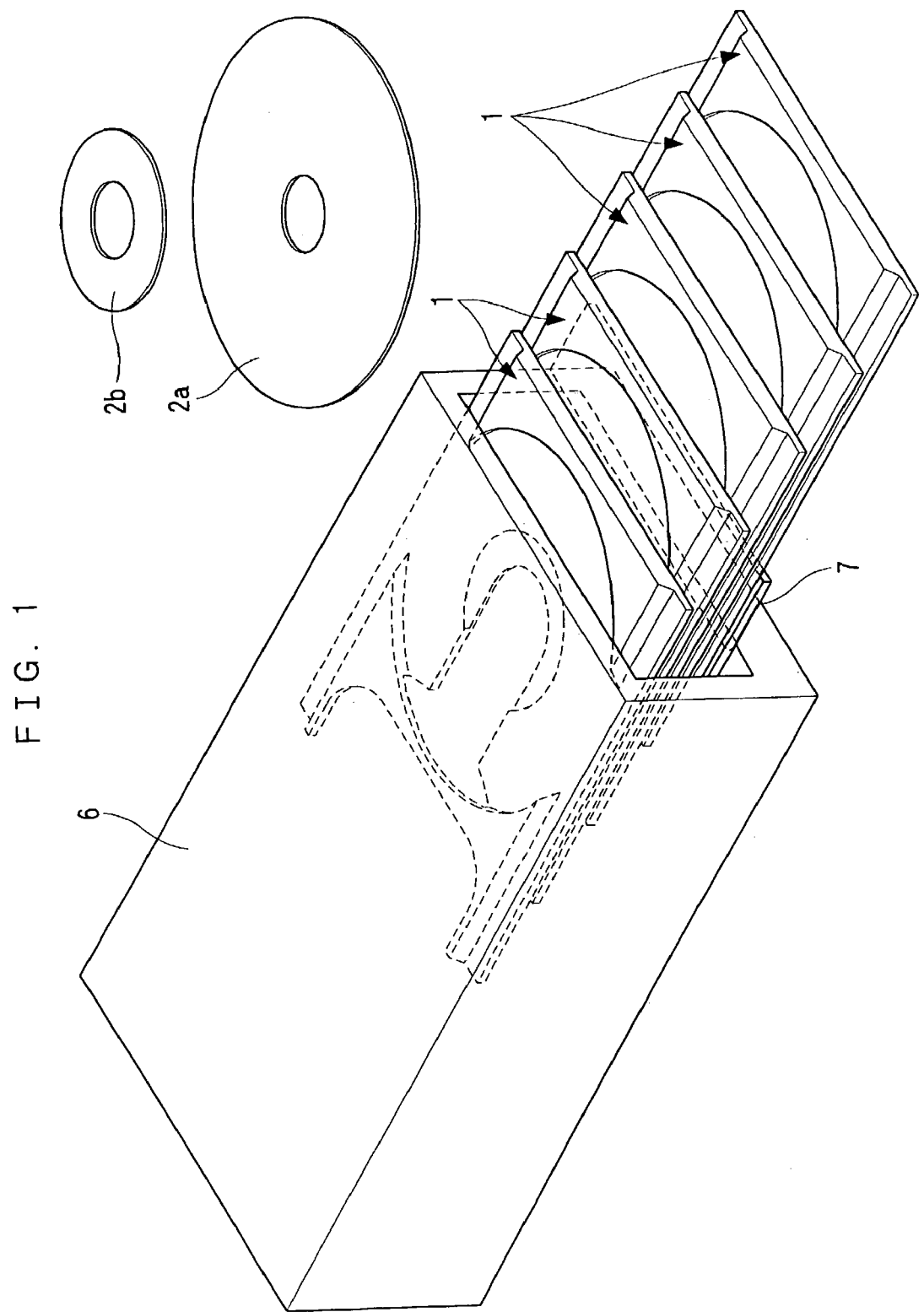
FIG. 1 is a perspective view showing an example of the present, invention in an all-open state of a disk changer.

FIG. 1 is a perspective view showing a characteristic full-open state of a disk changer according to the present invention. Reference numeral 1 denotes of five trays, reference numeral 2a denotes a disk of 12 cm, reference numeral 2b denotes a disk of 8 cm, and reference numeral 6 denotes an outer frame body of a product having the present device, and reference numeral 7 denotes a door. Further, FIGS. 2(a) to 2(f) are schematic left side views for explaining the operation of disks in this device. Reference numeral 1 denotes five trays, reference numeral 60 denotes a disk recording/reproducing section, reference character X denotes an attaching/detaching position, reference character Y denotes a standby position, and reference character Z denotes a recording/reproducing position.

In FIGS. 2(a) to 2(f), FIG. 2(a) shows a RESET state. All the five trays 1 are stored and aligned with one another on the standby position Y. FIG. 2(b) shows an exchanging state. It is found that the disks 2a (2b) can be loaded or ejected by moving the trays 1 on specific addresses one by one to the attaching/detaching position X. FIG. 2(c) shows a recording/reproducing state. The tray 1 on a specific address is moved to the recording/reproducing position Z and is stopped thereon, so that recording or reproduction is started on the disk 2a (2b) on the tray 1 and the disk 2a (2b) can be exchanged for each address before recording and reproduction.

Moreover, FIG. 2(d) is an exchanging state during recording and reproduction. Except for the disk 2a (2b) on the tray 1 during recording and reproduction, the trays 1 on all the other addresses are moved to the attaching/detaching position X for each address, so that the disks 2a (2b) can be loaded or ejected. FIG. 2(e) shows the full-open state of FIG. 1. All the trays 1 are moved from the standby position Y to the attaching/detaching position X and the trays 1 are arranged like steps. FIG. 2(f) shows a full-open state during recording and reproduction. All the trays 1 other than the tray during recording and reproduction are moved from the standby position Y to the attaching/detaching position X and all the trays 1 are arranged like steps at the attaching/detaching position X.

Figure 3:
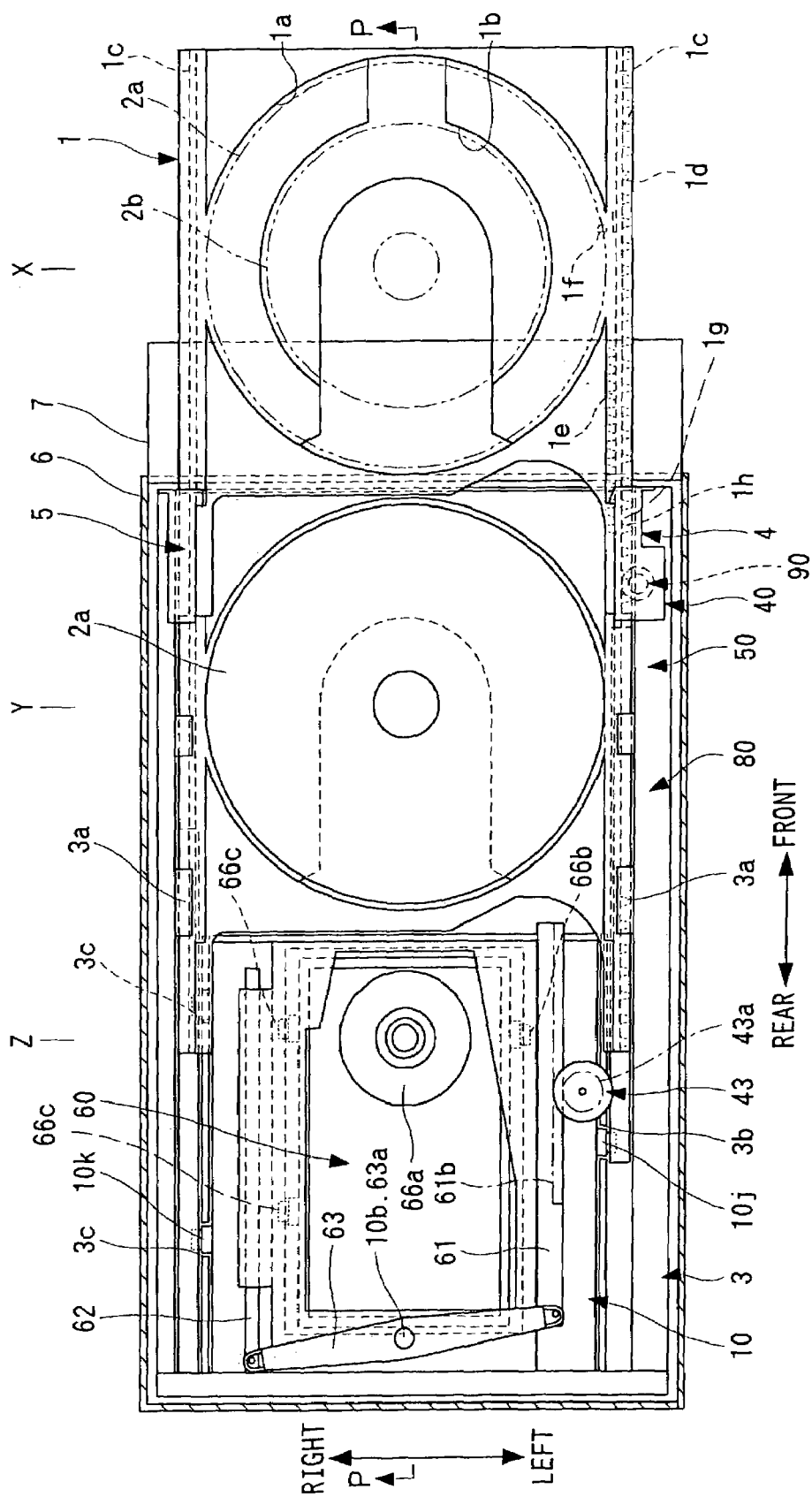
FIG. 3 is a top view of the disk changer.
Figure 4:
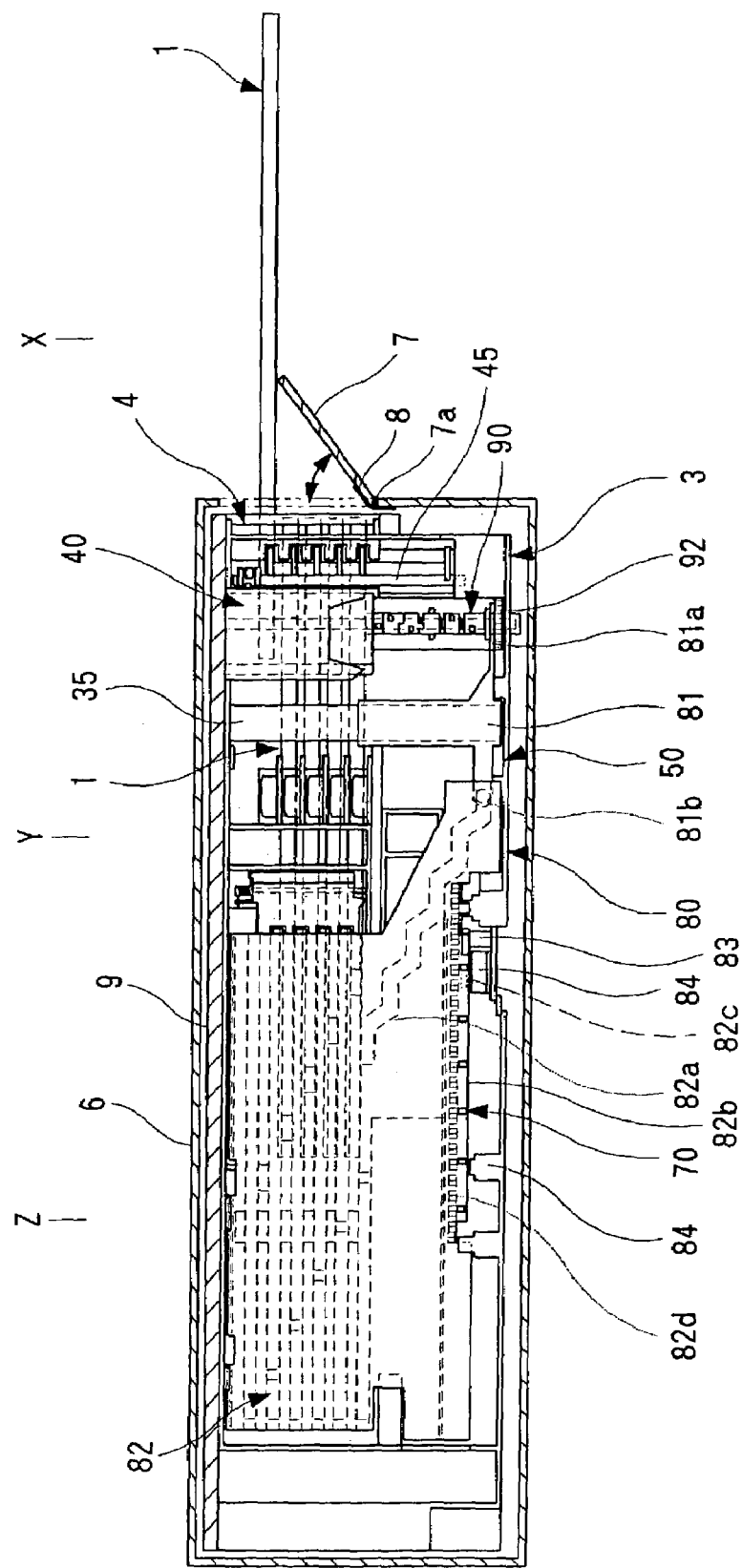
FIG. 4 is a left side view of FIG. 3.
Figure 5:
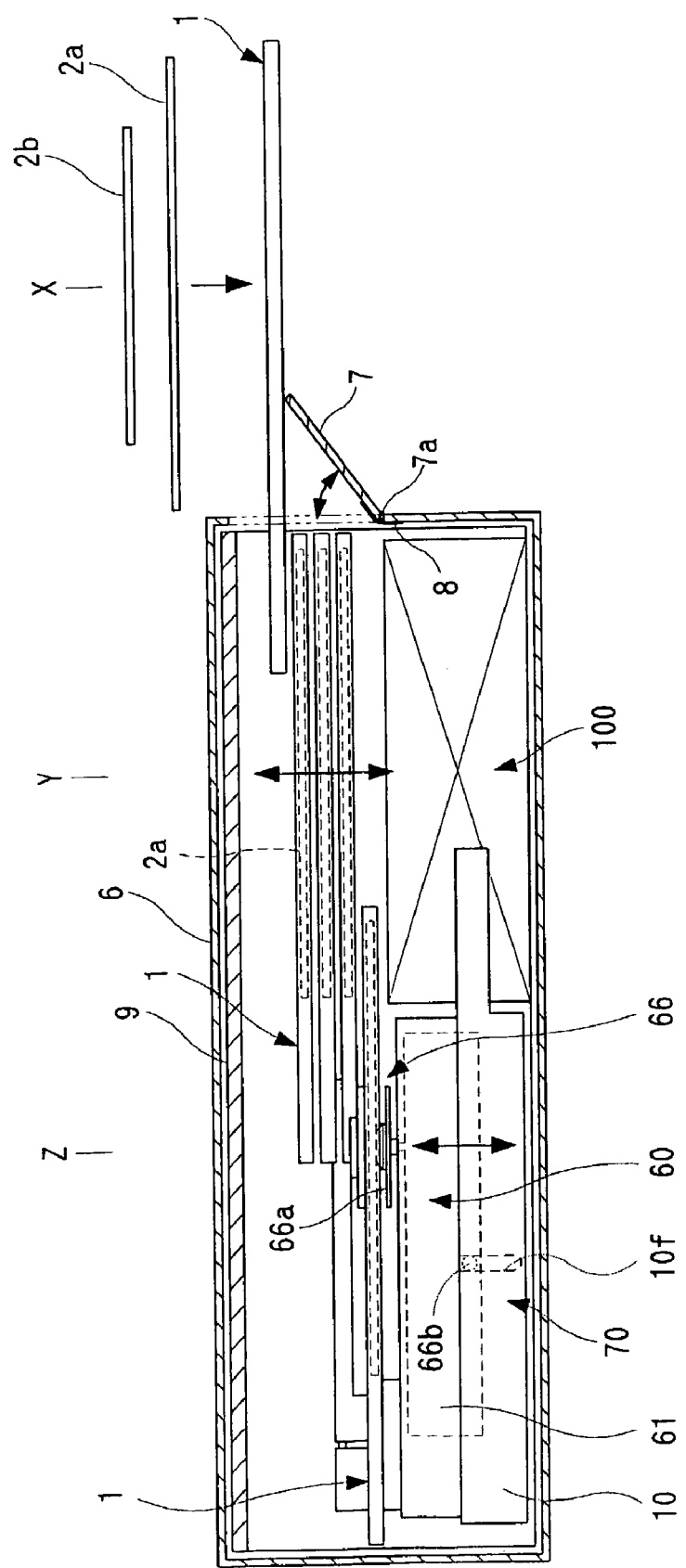
FIG. 5 is a sectional view taken along line P—P of FIG. 3.

Regarding the disk changer characterized by the above operations according to embodiments of the present invention, the whole configuration will be firstly discussed in accordance with FIGS. 3 to 5.

FIG. 3 is a top view of a disk changer according to the embodiment of the present invention, FIG. 4 is a left side view of FIG. 3, and FIG. 5 is a sectional view taken along line P—P of FIG. 3.

In FIGS. 3 to 5, reference numeral 1 denotes trays each having a large diameter step 1a and a small diameter step. 1b on the upper surface. Thus, the disks 2a and 2b having different outside shapes can be loaded thereon. In the tray 1, grooves 1c are formed on both sides of the back, a rack 1d is formed on the left side, a rack 1e is formed on the back of the left rear in parallel with the rack 1d, the rack 1e having the same module as that of the rack 1d, and a protruding rib if is formed on the left intermediate portion of the back. Further, a switch cam 1g is provided at the front of the lower stage of the rack 1d, and recessed portions 1h are formed which are shared as the rack 1d.

The five (a plurality of) trays 1 are separately arranged in parallel while being stacked substantially in a perpendicular direction (vertical direction), which is at right angles to the main surfaces of the disks 2a and 2b. Moreover, as shown in FIG. 3, the trays 1 are supported by guide ribs 3a, which are provided inside on the right and left of a mechanical base 3, and a left tray guide 4 and a right tray guide 5, so that the trays 1 move substantially in a horizontal direction (lateral direction) which is in parallel with the main surfaces of the disks 2a and 2b. At this point, the movement is made by a tray transfer unit 50, which is provided on the left, between the attaching/detaching position X, the standby position Y, and the recording/reproducing position Z. FIGS. 3 to 5 show that the tray 1 on the highest stage is located on the attaching/detaching position X.

Reference numeral 6 denotes the outer frame body of the product having the present device. The door 7 is provided on the front side of the trays 1 located on the standby position Y. The door 7 rotates around a fulcrum positioned on the lower part. As indicated by virtual lines of FIGS. 4 and 5, the door 7 is normally closed by energization of a door spring. 8. When the tray 1 is moved from the standby position Y to the attaching/detaching position X, as indicated by solid lines of FIGS. 4 and 5, the door is pressed and opened by the tray 1.

The disk recording/reproducing section 60 is provided behind the trays located on the standby position Y. The disk recording/reproducing section 60 is supported by a left guide rib 3b and a right guide rib 3c, which are formed on the side of the mechanical base 3, and is, moved in a perpendicular direction (vertical direction) by an elevating unit 70, which will be discussed later. Further, a driving mechanism 100 composed of a motor for driving each part, a gear line, and a detection switch, is provided, under the trays 1 located on the standby position Y.

A tray selecting unit 80 for selecting a specified tray 1 and a tray driving unit 90 and a tray gear unit 40, which serve as the tray selecting unit 80 and a tray transfer unit 50, are provided outside the left side of the mechanical base 3 shown in FIG. 4. Moreover, a top cover 9 is attached to the top of the mechanical base 3 to prevent dust and obtain stiffness.

Figure 6:
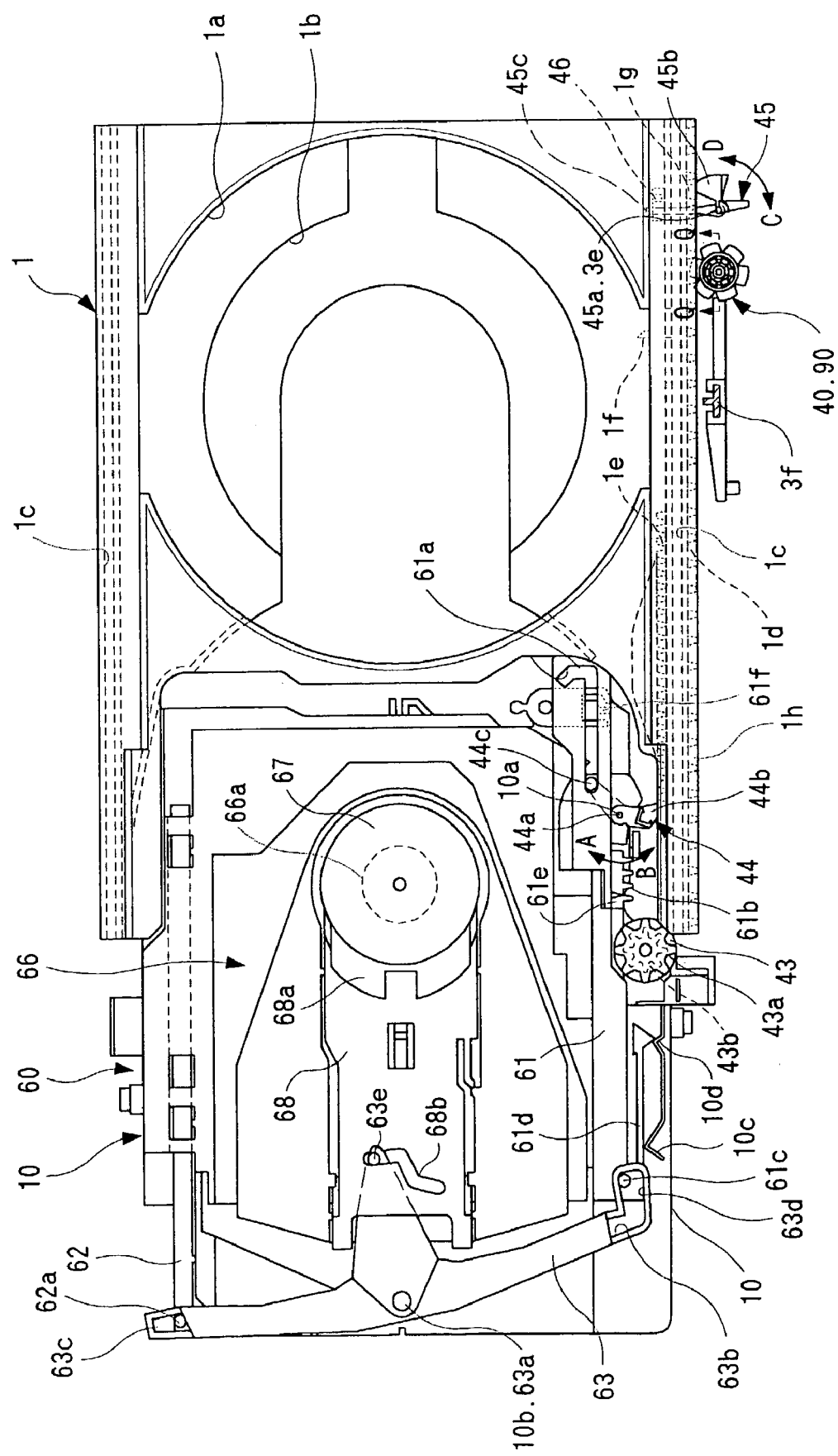
FIG. 6 is a top view showing the detail of a tray transfer unit.
Figure 7:
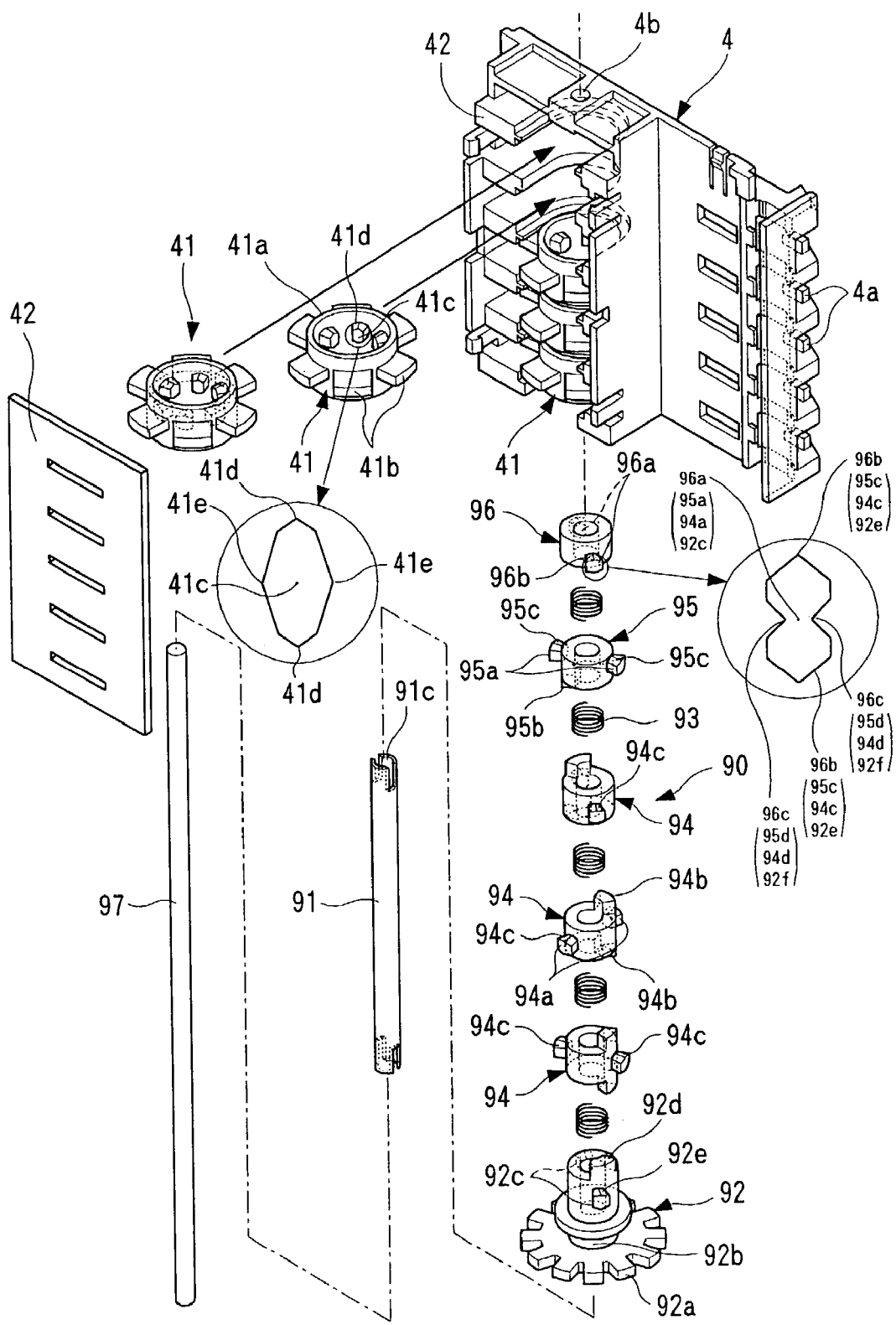
FIG. 7 is an exploded perspective view showing a tray gear, unit and a tray driving unit.
Figure 10C:
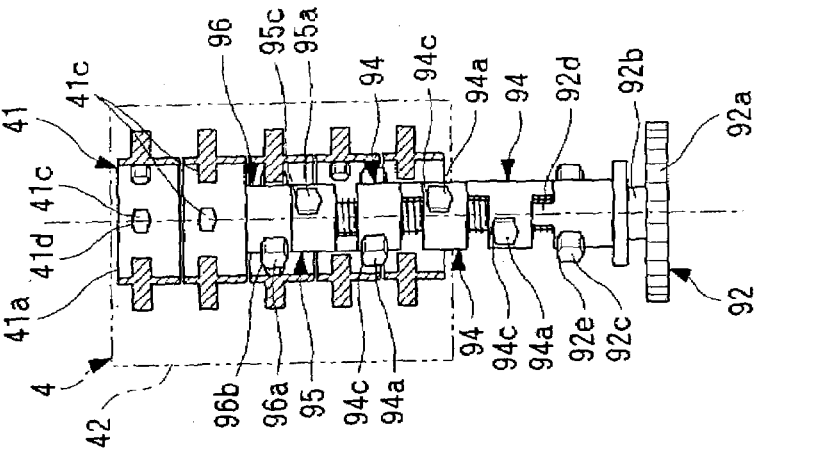
FIGS. 10(a) to 10(c) are detail sectional views for explaining the relationship between the tray gear unit and the tray driving unit.
Figure 10B:
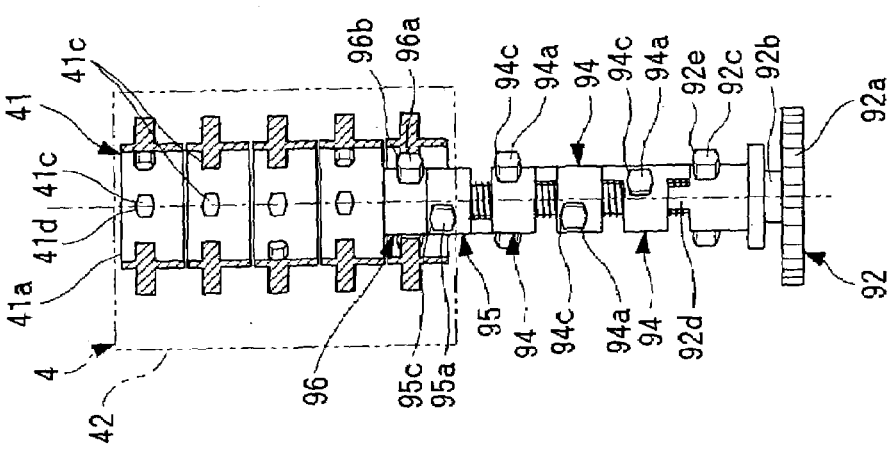
Figure 10A:
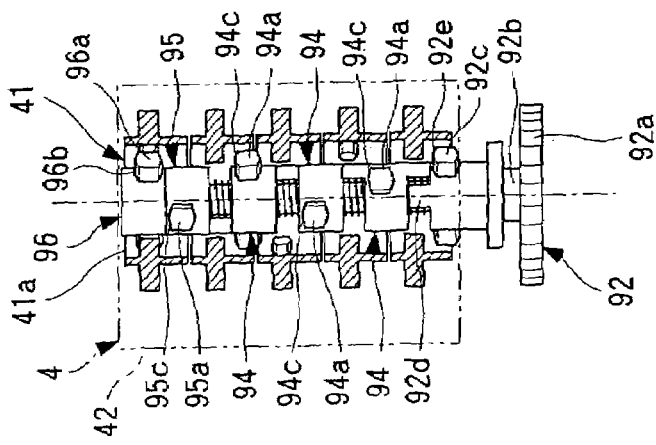

FIG. 6 is a top view showing the detail of the tray transfer unit 50, FIG. 7 is an exploded perspective view showing the tray gear unit 40 and the tray driving unit 90, FIG. 8 is a sectional view taken along line Q—Q of FIG. 6, FIGS. 9(a) and 9(b) are detail top views showing the positional relationship between the tray gear unit 40 and the tray driving unit 90, and FIGS. 10(a) to 10(c) are detail sectional views showing the relationship between the tray gear unit 40 and the tray driving unit 90.

In FIGS. 6 to 10, in the tray gear unit 40 which is provided ahead of the left of the trays 1 located on the standby position Y, five (a plurality of) tray gears 41 are rotatably attached to the same shaft and tray gears 41 are held by gear holders 42 on the left tray guide 4. Here, the left tray guide 4 has guide ribs 4a which are engaged with the groove 1c of the tray 1 together with the guide rib 3a of the mechanical base 3 in such a manner as to move the trays 1 in a horizontal direction (forward and backward direction).

Each of the tray gears 41 has a gear 41b formed on the outer circumference of a cylindrical part 41a and six cams 41c formed on the internal circumference by dividing the circumference into 6 equal portions. The tray gears 41 are stacked and are paired with the trays 1. Since the tray gears 41 are separated from one another, independent rotations can be performed. Besides, the cam 41c has chambered portions 41d in three directions on the upper end and the lower end, and a concave portion 41e formed in a lateral direction (rotating direction). Further, since the gear 41b is engaged with the rack id formed on the left side of the tray 1, the tray 1 is moved by rotating the tray gear 41.

Then, when the tray 1 is moved from the standby position Y to the rear, the gear 41b of the tray gear 41 and the rack 1d of the tray 1 are disengaged from each other. Simultaneously, the rack 1e formed on the back of the left rear of the tray 1 is engaged with a gear 43a of a load gear 43, which is rotatably attached to an elevating base 10. The tray 1 is moved from the position by rotating the load gear 43. Besides, the gear 43a of the load gear 43 is equal to the gear 41b of the tray gear 41 in the module and the number of teeth.

Subsequently, when the tray 1 is moved to the rear and the center of the loaded disks 2a and 2b comes close to the center of a turntable 66a of the disk recording/reproducing section 60, the protruding rib 1f formed on the back of the tray 1 is engaged with a driving cam 44b of a tray switching lever 44. The tray switching lever 44 is rotatably attached to a shaft 10a of the elevating base 10 via a hole 44a and thus the tray switching lever 44 is rotated in the direction of arrow A (FIG. 6) by a moving force applied to the rear of the tray 1. Then, since an L-shaped cam 61a is driven by a pin 44c on the other end of the tray switching bar 44, a left sliding plate 61 is moved forward and a small rack 61b is engaged, with the gear 43b of the load gear, 43.

Meanwhile, the movement of the tray 1 to the recording/reproducing position Z is completed, the rack le of the tray 1 and the teeth 43a of the load gear 43 are disengaged, and the tray switching lever 44 is held without being rotated by the engagement of the pin 44c and the L-shaped cam 61a of the left sliding plate 61 which has moved forward. Thus, the tray 1 having the protruding rib 1f engaged with the, driving cam 44b of the tray switching lever 44 is also held without moving back and forth.

In the tray driving unit 90, a tray driving gear 92 is fixed on the lower end of the outer circumference of a driving pipe 91, and four return springs 93 and three third tray driving cams 94 are alternately attached thereon. Thereafter, a single second tray driving cam 95 is inserted and a first tray driving cam 96 is fixed on the upper end. Besides, the return springs 93, the third tray driving cams 94, and the second tray driving cam 95 can be rotated separately from the driving pipe 91.

The tray driving gear 92 has a gear 92a on the lower end, a groove 92b on the gear 92a, and two driving cams 92c shifted along a straight line from the rotational center to the outside taken from the top. Moreover, a protrusion 92d is formed on the upper end with a width of 60° taken from the top.

Each of the third tray driving cams 94 also has two driving cams 94a shifted along a straight line from the rotational center to the outside taken from the top. On the upper end and the lower end, a protrusion 94b with a width of 60° is formed on the same position taken from the top. Further, the second tray driving cam 95 also has two driving cams 95a, shifted along a straight, line from the rotational center to the outside taken from the top. On the lower end, a protrusion 95b is formed with a width of 60° taken from the top.

Then, each member is energized by the return springs 93 attached between the members so that the members rotate clockwise taken from the top. Thus, the adjacent protrusions 92d, 94b, and 95b are stopped while making contact with one another as shown in FIG. 9(a).

The first tray driving cam 96 also have two driving cams 96a shifted along a straight line from the rotational center to the outside taken from the top, and the driving cams 96a and the driving cams 92c of the tray driving gear 92 are fixed on the same position taken from the top. The driving cams 92c, 94a, 95a, and 96a each have chamfered surfaces 92e, 94c, 95c, and 96b of two directions on the upper ends and the lower ends and recessed portions 92f, 94d, 95d, and 96c in the lateral direction (rotating direction).

Further, the tray driving unit 90 is attached to a shaft 97, which is fixed over a seat 3d of the mechanical base 3 and a hole 4b of the left tray guide 4, via an inner diameter hole 91c of the driving pipe 91 in such a way that the tray driving unit 90 can rotate and slide vertically. The tray driving unit 90 is inserted into the cylindrical part 41a of the tray gear 41 in the tray gear unit 40 in such a way that the tray driving unit 90 can slide vertically.

At this point, as shown in FIG. 9(b), taken from the top, since the driving cams 92c, 94a, 95a, and 96a are aligned with one another and have a gap from the six cams 41c of the tray gear 41, passage can be made. Even if the positions are slightly moved, induced correction can be made by the chamfered portions 41d, 92e, 94c, 95c, and 96b.

Further, since the driving cams 92c, 94a, 95a, and 96a are engaged with the six cams of the tray gear 41 to transmit driving force, the gear 92a of the tray driving gear 92 is rotated by the driving mechanism 100, which will be discussed later, so that the tray 1 can be moved. At this point, even if the positions of the six cams 41c of the tray gear 41 are slightly shifted vertically from those of the driving cams 92c, 94a, 95a, and 96a, inducing correction can be made by the concave portion 41e and the recessed portions 92f, 94d, 95d, and 96c. Moreover, the six cams 41c of the engaged tray gear 41 can be selected by vertically moving the tray driving cams 94, 95, and 96 and thus the tray 1 to be moved can be selected.

Reference numeral 45 denotes an open switch lever in which a shaft 45a is rotatably attached to a bearing hole 3e of the mechanical base 3 and five cams 45b are engaged with the switch cams 1g provided on the lower stages of the racks 1d of the five trays 1. The cams 45b rotate in the direction of arrow C–D. Besides, a lever 45c is formed on the lower end of the open switch lever 45. The lever 45c is engaged with the open switch 46 provided on the mechanical base 3 and detects the position of the tray 1 moving back and forth.

FIG. 11 is a left side view showing the detail of the tray selecting unit 80, FIG. 12 is a left inside view showing a main part of FIG. 11, and FIG. 13 is a top view showing the main part of FIG. 11. In FIG. 11, reference numeral 81 denotes a select guide which is attached to a T-shaped rib 3f so as to slide vertically. The T-shaped rib 3f is formed on the mechanical base 3. On the front end of the select guide 81, a hook 81a is formed which is engaged with the groove 92b of the tray driving gear 92 and rotatably supports the tray driving gear 92. Further, a pin 81b is formed on the rear end of the select guide 81.

Reference numeral 82 denotes a select rack which is attached to the guide rib 3g of the mechanical base 3 so as to move vertically. A stepped cam 82a provided on the front end is engaged with the pin 81b of the select guide 81. Thus, the select guide 81 is vertically moved by moving the select rack 82 back and forth and thus the engaged tray driving gear. 92, that is, the tray driving unit 90 is moved vertically so that the, tray 1 to be moved can be selected.

A sensor rib 82b and a rib 82c are formed on the lower end of the select rack 82. The sensor rib 82b is engaged with a photosensor 83 provided on the mechanical base 3 and detects a position in the forward and backward directions. The rib 82c is engaged with a bottom switch 84 provided on the mechanical base 3 and detects a position of origin in the forward and backward directions. Further, a rack 82d is formed on the lower back of the select rack 82 and is driven by the driving mechanism 100, which will be discussed later, so as to move back and forth.

Reference numeral, 85 denotes tray lock levers which are rotatably attached to a shaft 3h of the mechanical base 3 via 1a hole 85a. The five tray lock levers 85 are stacked vertically and are paired with the trays 1, respectively. A lock cam 85b is provided on the front end of the tray lock lever 85. The lock cam 85b rotates in the direction of arrow E (FIG. 13) so as to be engaged with the recessed portion 1h formed on the tray 1, thereby preventing the tray 1 from moving back and forth. Simultaneously, the displacement of the stopping position of the tray 1 in the forward and backward directions is corrected by induction on a chamfered portion 85c formed on the front end of the tray lock lever 85.

A locking protrusion 85d is provided on the back of the lock cam 85b. The locking protrusion 85d is engaged with cams 82e-1 to 82e-5 formed in five lines in parallel on the back of the select rack 82, and the tray lock lever 85 is rotated in the direction of arrow F (FIG. 13). A releasing protrusion 85e provided on the rear end of the tray lock lever 85 is similarly engaged with cams 82f-1 to 82f-5 formed in five lines in parallel, and the tray lock lever 85 is rotated in the direction of arrow F (FIG. 13), and thus the lock cam 85b on the front end and the recessed portion 1h of the tray 1 are disengaged from each other.

Figure 14:
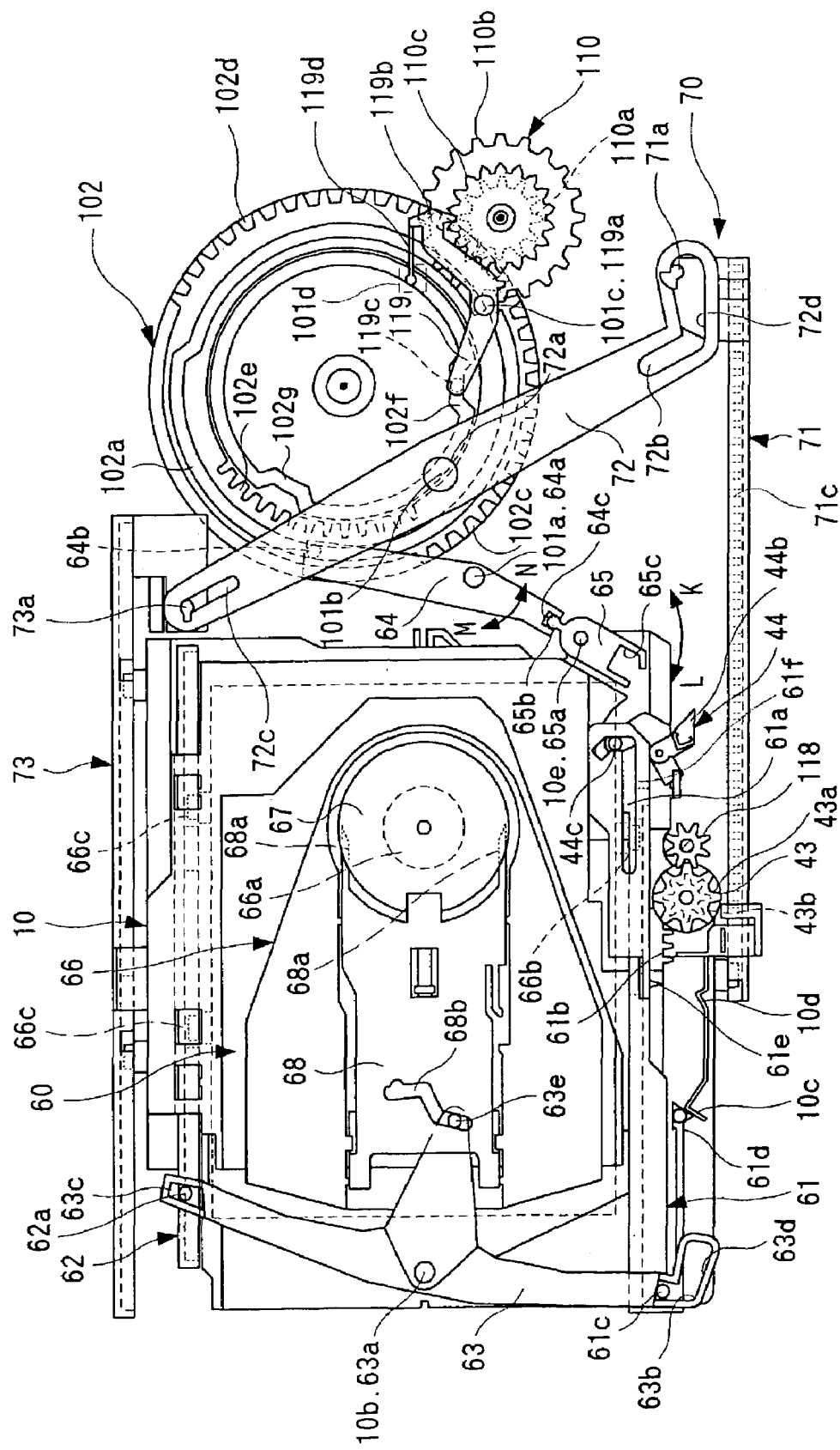
FIG. 14 is a to view showing the positional relationship between a disk recording/reproducing section and an elevating unit.
Figure 15:
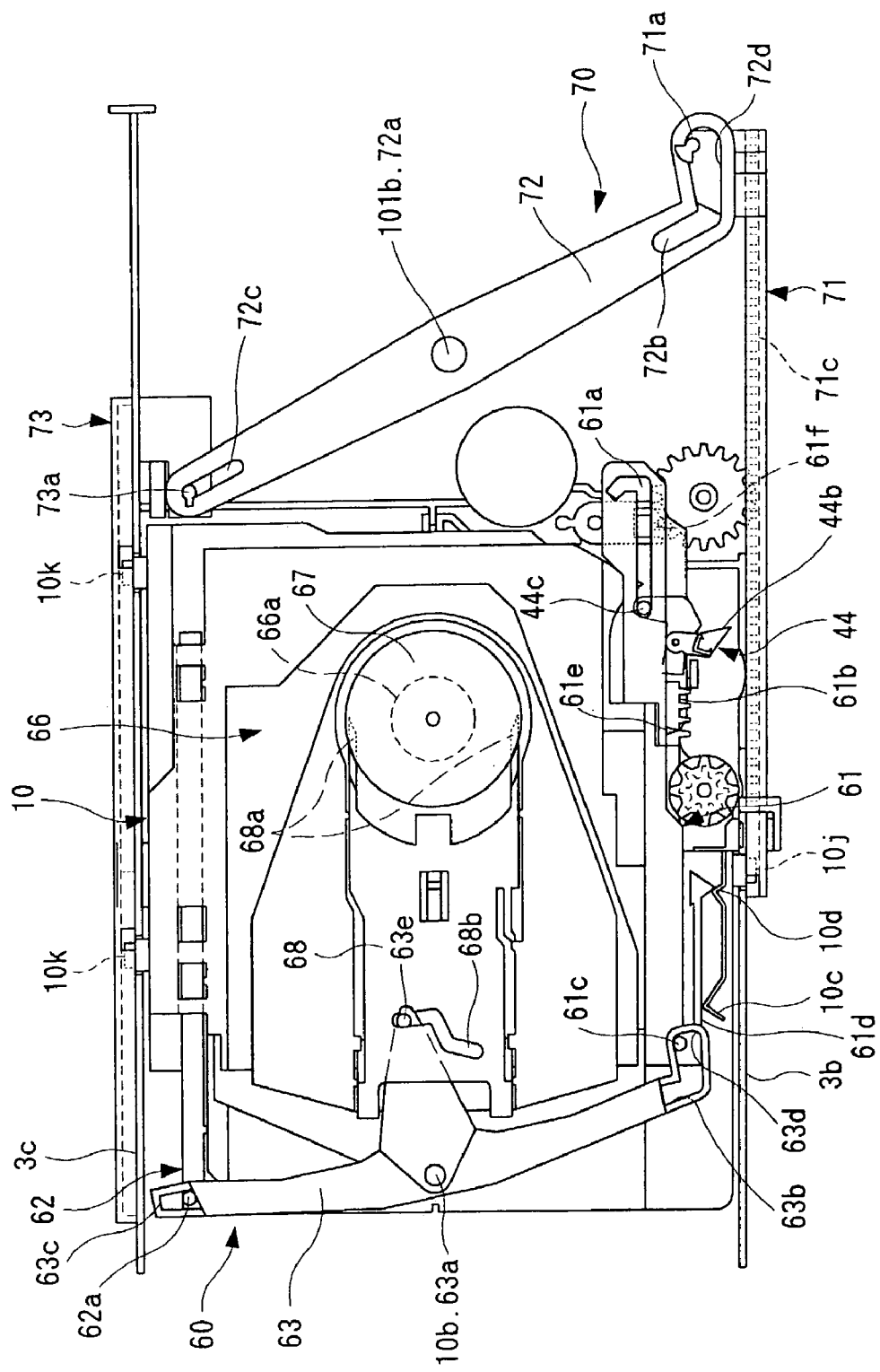
FIG. 15 is a top view sowing the detail of an elevating state of the disk recording/reproducing section.
Figure 16:
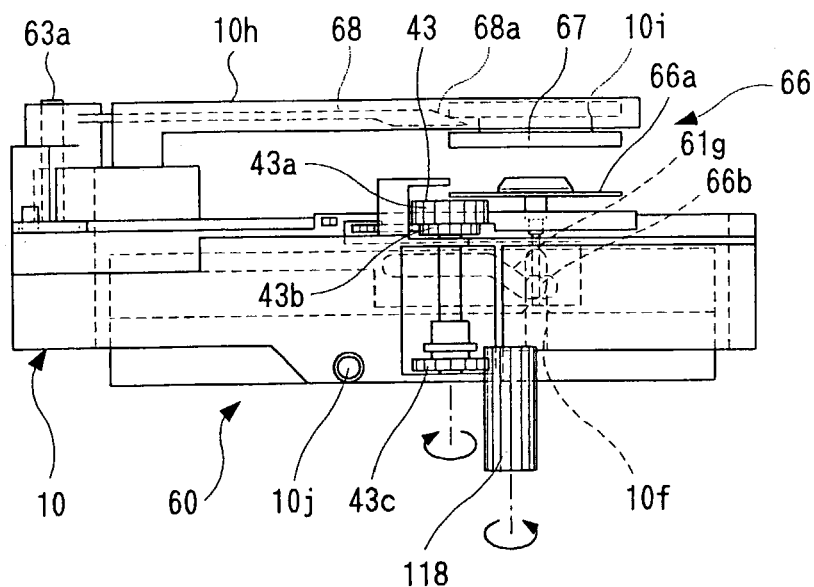
FIGS. 16(a) and 16(b) are left side views of FIG. 15.
Figure 16:
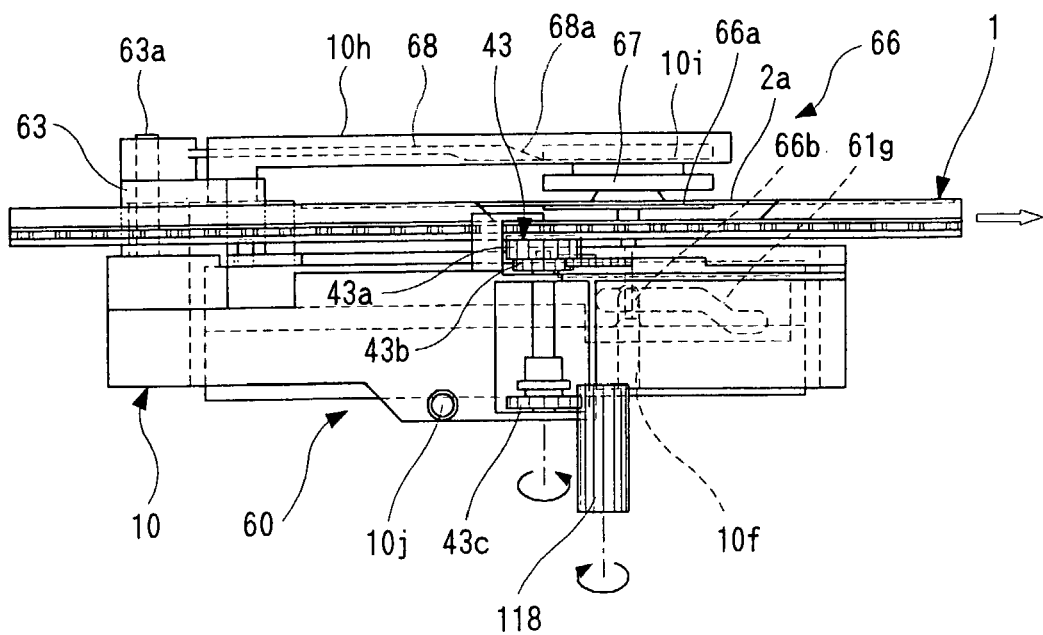
Figure 17:
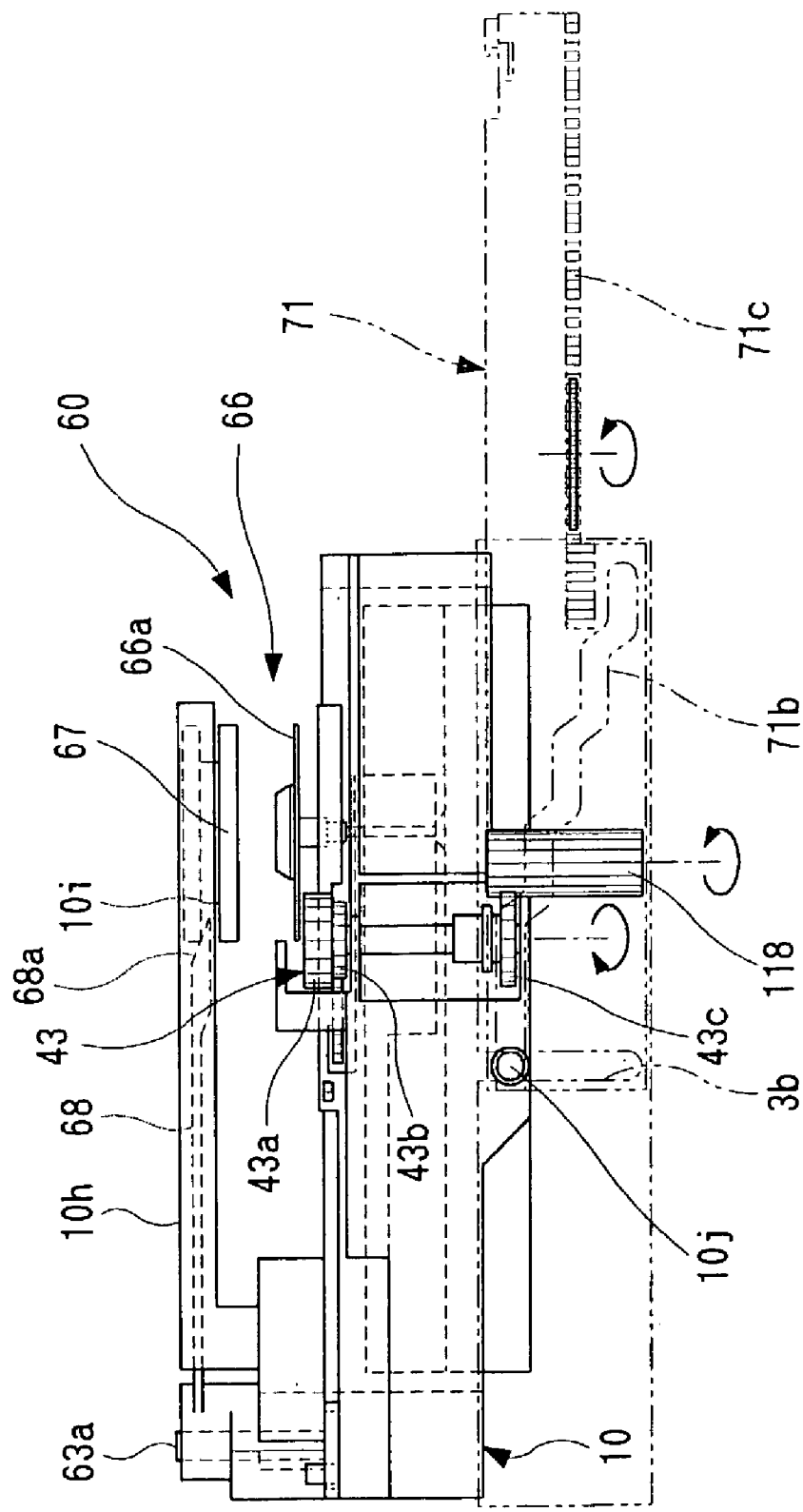
FIG. 17 is a left side view of FIG. 14.
Figure 18:
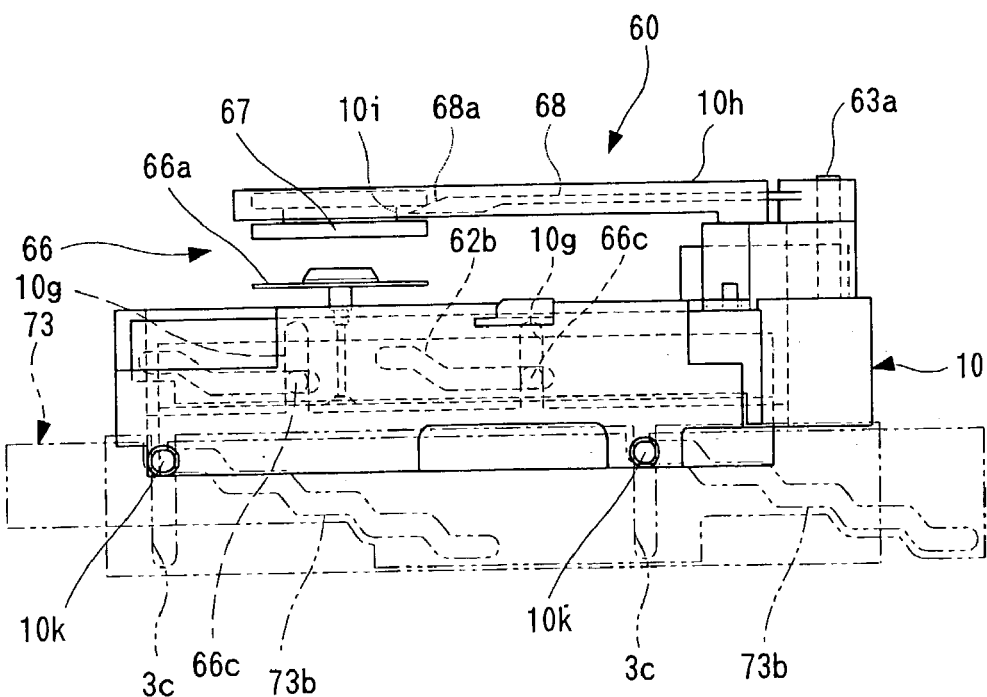
FIG. 18 is a right side view of FIG. 14.

FIG. 14 is a top view showing the positional relationship between the disk recording/reproducing section 60 and the elevating unit 70, FIG. 15 is a top view showing the detail of an elevating state of the disk recording/reproducing section 60, FIGS. 16(a) and 16(b) are left side views of FIG. 14 or FIG. 15, FIG. 17 is a left side view of FIG. 14, and FIG. 18 is a right side view of FIG. 14.

In FIGS. 14, to 18, the left sliding plate 61 and the right sliding plate 62 are attached on the elevating base 10 so as to move back and forth. Further, a pin 61c formed on the rear end of the left sliding plate 61 is engaged with a cam hole 63b formed on the left end of a connecting lever 63, which is rotatably attached to a shaft 10b of the elevating base 10 via a hole 63a. A pin 62a formed on the rear end of the right sliding plate 62 is engaged with a long hole 63c formed on the right end of the connecting lever 63. Thus, the left sliding plate 61 and the right sliding plate 62 are interlocked with each other and are moved via the connecting lever 63.

However, when the left sliding plate 61 is moved forward to a certain degree or more, the pin 61c of the left sliding plate 61 is shifted to engagement with the long hole 63d of the cam hole 63b, so that the rotation of the connecting lever 63 is stopped and is kept in the same state. Thus, only the left sliding plate 61 is further moved forward.

Further, the left sliding plate 61 is normally held toward the rear of a portion where a click spring 61d is engaged with a first tilting cam 10c formed on the elevating base 10. At this point, the small rack 61b of the left sliding plate 61 and the gear 43b of the load gear 43 have a gap and are not engaged with each other. However, as described above, engagement is made as the tray 1 is moved from the standby position Y to the recording/reproducing position Z, and the left sliding plate 61 is moved by the rotation of the load gear 43.

When the left sliding plate 61 is further moved forward, engagement of the left sliding plate 61 and the load gear 43 is shifted to engagement of a large rack 61e and the gear 43a. Thereafter, the large rack 61e and the gear 43a are disengaged from each other, and the left sliding plate 61 is held toward the front of a portion where the click spring 61d is engaged with a second tilting cam 10d formed on the elevating base 10. Thus, it is possible to obtain a gap between the large, rack 61e and the gear 43a. Additionally, the load gear 43 has a lower gear 43c driven by the driving mechanism 100, which will be discussed later.

Reference numeral 64 denotes a center detaching lever which is rotatably attached to a shaft 101a via a hole 64a to a shaft 101a formed on a large pitch plate 101 of the driving mechanism 100, which will be discussed later. The pin 64b provided on the right end of the center detaching lever 64 is similarly engaged with a detaching cam 102a on a main gear 102 of the driving mechanism 100, which will be discussed later. Meanwhile, a cam 64c provided on the left end of the center detaching lever 64 is engaged with a pin 65b provided on the inner end of an end detaching lever 65. Here, the end detaching lever 65 is rotatably attached to a shaft 10e of the elevating base 10 via a hole 65a.

Moreover, a cam 65c formed on the outer end of the end detaching lever 65 is engaged with a square pin 61f formed on the back when the left sliding plate 61 is moved forward. Therefore, the main gear 102 can control the movement of the left sliding plate 61 in the forward and backward directions. Besides, the pin 65b of the end detaching lever 65 is formed with a long shape in a vertical direction so that engagement with the cam 64c of the center detaching lever 64 can be maintained even when the pin 65b is vertically moved by the elevating unit 70, which will be discussed later.

Reference numeral 66 denotes a recording/reproducing unit in which the disks 2a and 2b are held on the turntable 66a before recording or reproduction. Pins 66b and 66c provided on the right and left sides are engaged with guide ribs 10f and 10g of the elevating base 10, so that the recording/reproducing unit 66 is movably attached in a vertical direction. The single pin 66b on the left side is engaged with an elevating cam 61g of the left sliding plate 61, and the plurality of pins 66c on the right side are engaged with an elevating cam 62b of the right sliding plate 62. Thus, the recording/reproducing unit 66 is vertically moved in response to the movement of the left sliding plate 61 and the right sliding plate 62 in the forward and backward directions.

Reference numeral 67 denotes a clamper which is rotatably attached to a clamp plate 10h of the elevating base 10 via a hole 10i. The clamper 67 holds the disks 2a and 2b between the clamper 67 and the turntable 66a of the recording/reproducing unit 66 by a magnetic force. When the recording/reproducing unit 66 is moved upward, rotation can be made while obtaining a gap from the hole 10i.

Reference numeral 68 denotes a clamp guide which is attached to the clamp plate 10h of the elevating base 10 so as to move in the forward and backward directions. The clamp guide 68 has a tilting cam 68*a* engaged with the damper 67. At this point, when the clamp guide 68 is moved forward, the damper 67 is moved upward. When the clamp guide 68 is moved backward, the clamp guide 68 is disengaged from the damper 67, and the damper 67 enters a free state and moves downward. Further, the clamp guide 68 has a cam hole 68*b* on the rear end that is engaged with a pin 63*e* of the connecting lever 68, and the clamp guide 68 is moved in the forward and backward directions in response to the rotation of the connecting lever 63.

In FIGS. 15, 17, and 18, reference numeral 71 denotes a left elevating rack 67 which is attached to a groove 3*i* of the mechanical base 3 so as to move in the forward and backward directions, and reference numeral 73 denotes a right elevating rack which is attached to a groove 3*j* of the mechanical base 3 so as to move in the forward and backward directions. An elevating connection lever 72 is provided between the elevating racks 71 and 73, and the elevating connection lever 72 is rotatably attached to a shaft 101*b* formed on a large pitch plate 101 of the driving mechanism 100, which will be discussed later.

Then, a pin 71*a* formed on the front end of the left elevating rack 71 is engaged with a cam hole 72*b* formed on the left end of the elevating connection lever 72, and a pin 73*a* formed on the front end of the right elevating rack 73 is engaged with a long hole 72*c* formed on the right end of the elevating connecting lever 72, so that the elevating racks 71 and 73 are moved in synchronization with each other. However, when the left elevating rack 71 is moved forward to a certain degree or more, since the pin 71*a* of the left elevating rack 71 is shifted to engagement with the long hole 72*d* of the cam hole 72*b*, the rotation of the elevating connection lever 72 is stopped and is kept in its state. Thus, only the left elevating rack 71 is further moved forward.

In the disk recording/reproducing section 60, pins 10*j* and 10*k* are engaged with the guide ribs 3*b* and 3*c* on the right and left of the mechanical base 3 so as to move vertically. At this point, since the pin 10*j* is engaged with a stepped cam 71*b* of the left elevating rack 71 and the pin 10*k* is engaged with a stepped cam 73*b* of the right elevating rack 73, the elevating base 10 is vertically moved by the movement of the left elevating rack 71 and the right elevating rack 73 in the forward and backward directions. Moreover, a rack 71*c* is provided under the left elevating rack 71 and is driven by the driving mechanism 100, which will be discussed later.

Figure 19:
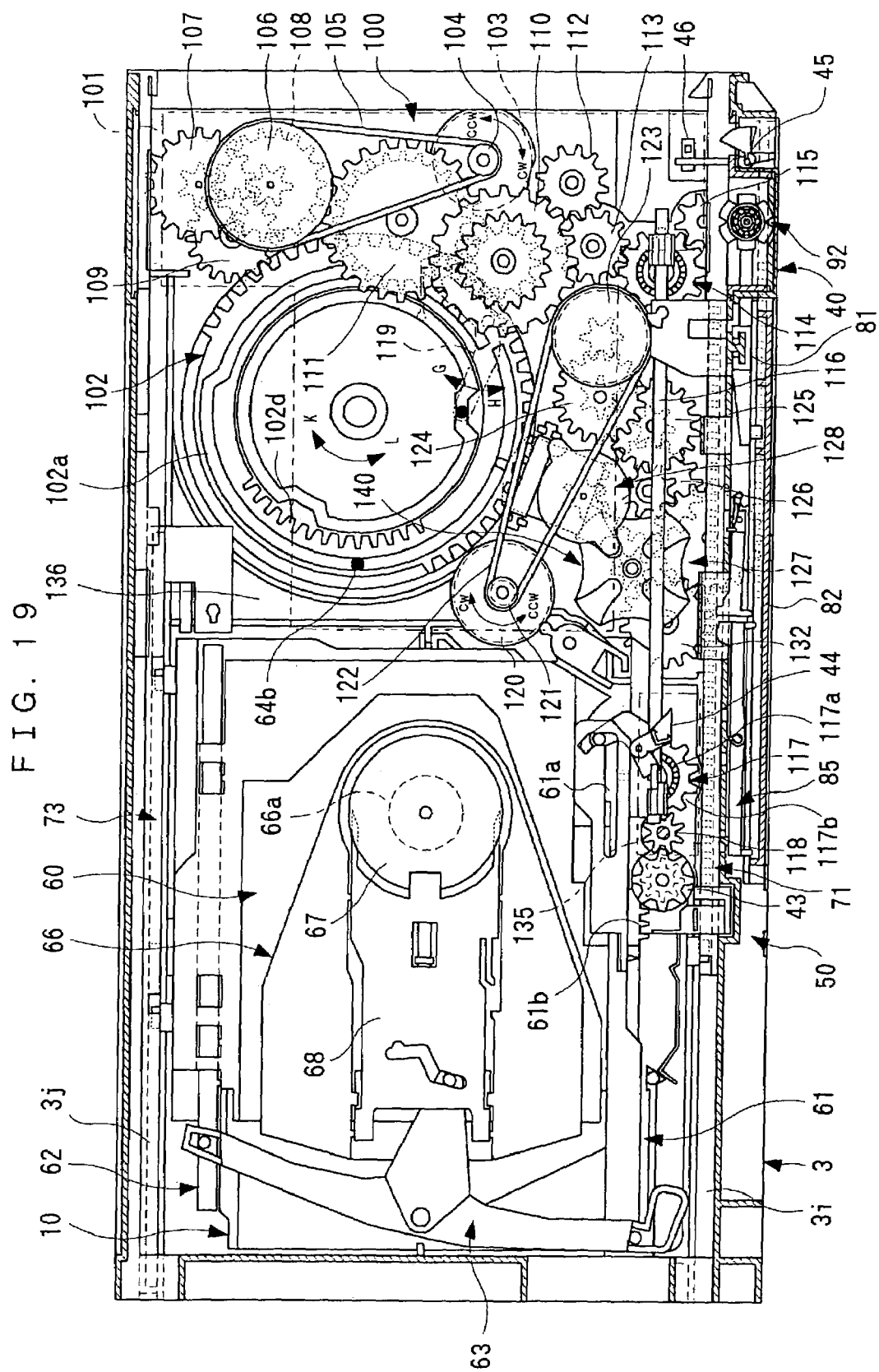
FIG. 19 is a top view showing the detail of a driving mechanism.
Figure 20:
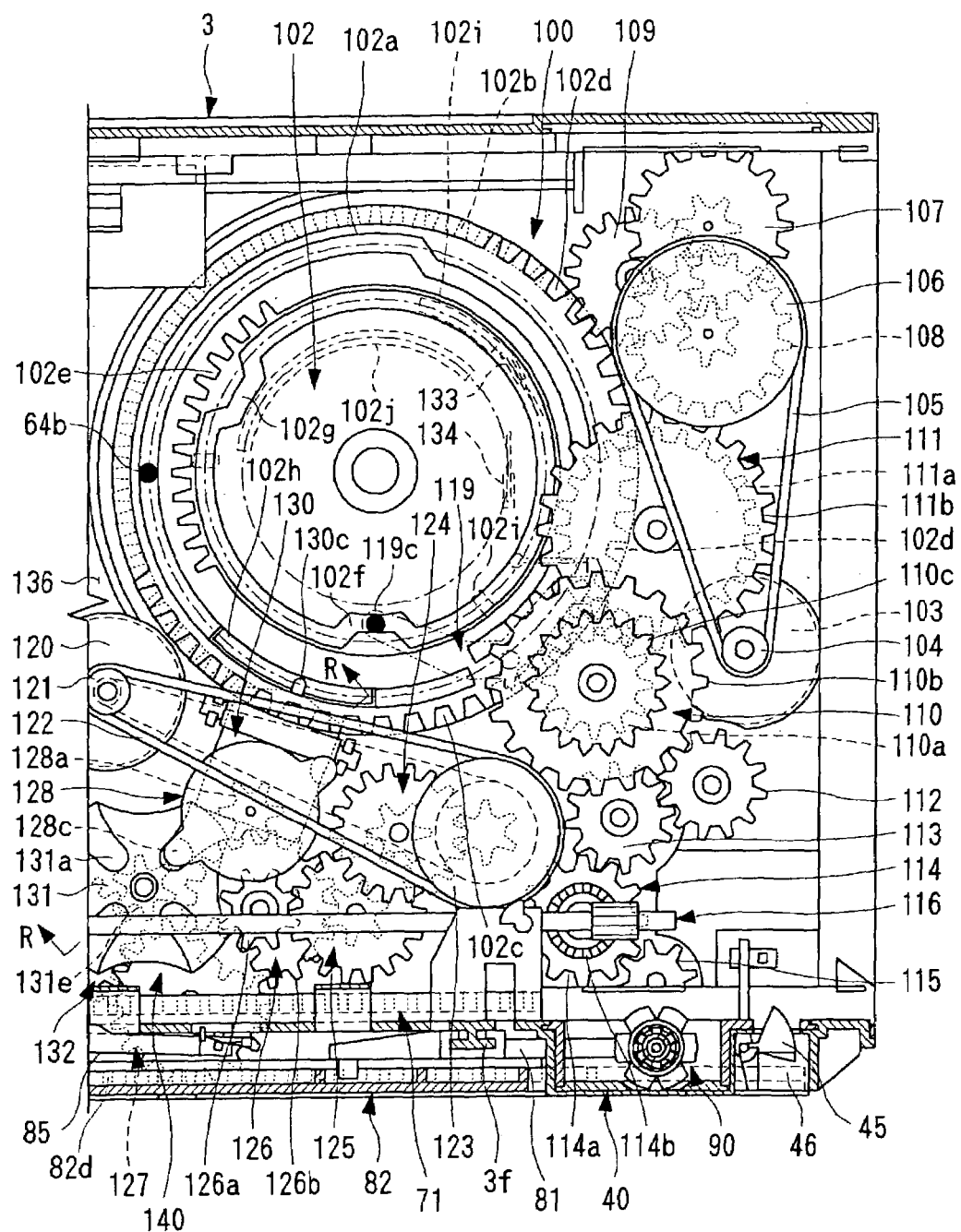
FIG. 20 is a top view showing the detail of a main part of FIG. 19.
Figure 21:
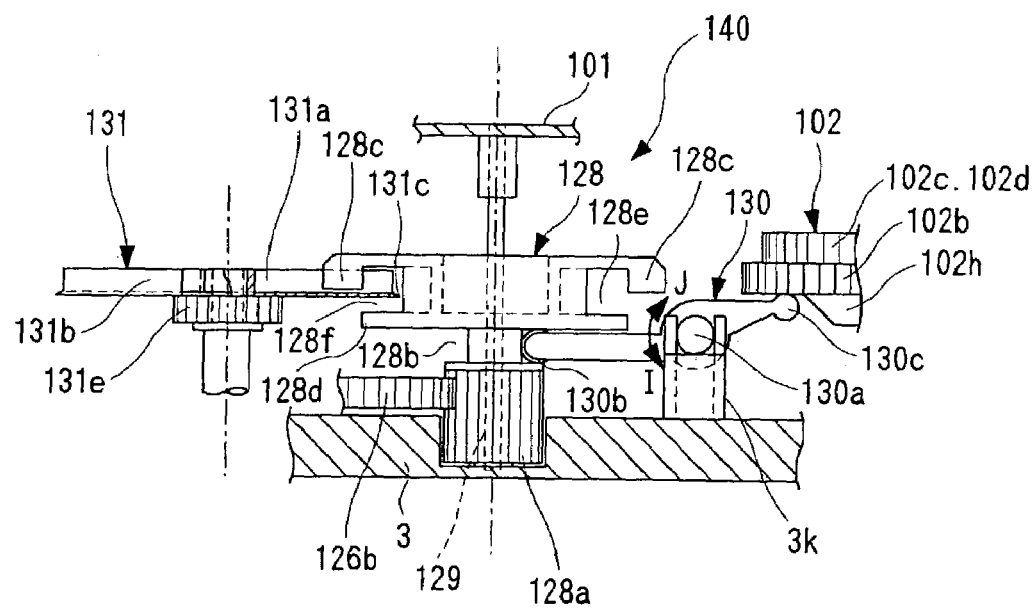
FIGS. 21(a) and 21(b), are sectional views taken along line R—R of FIG. 20.
Figure 21:
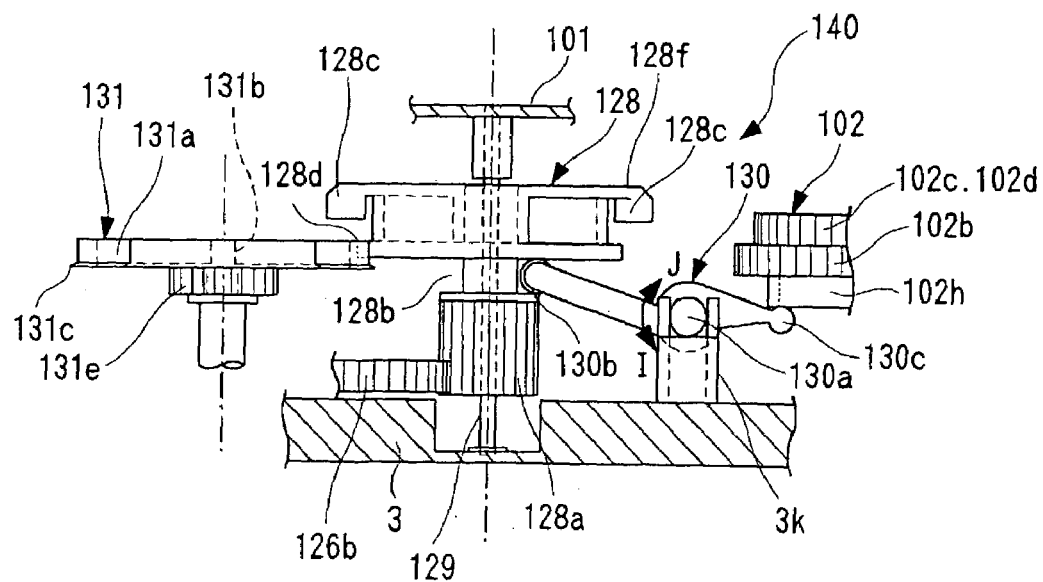
Figure 22:
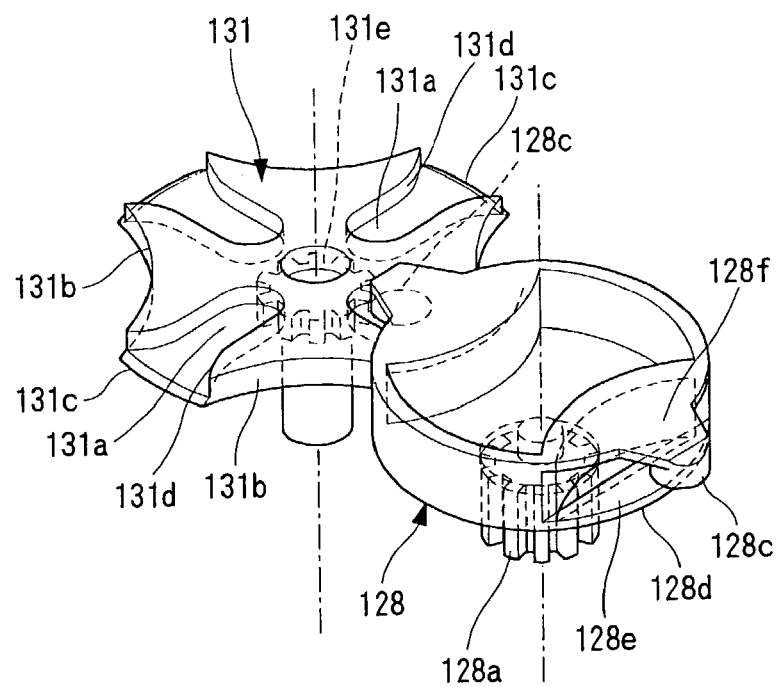
FIG. 22 is a perspective view showing the relationship between a switching gear and a Geneva gear.
Figure 23:
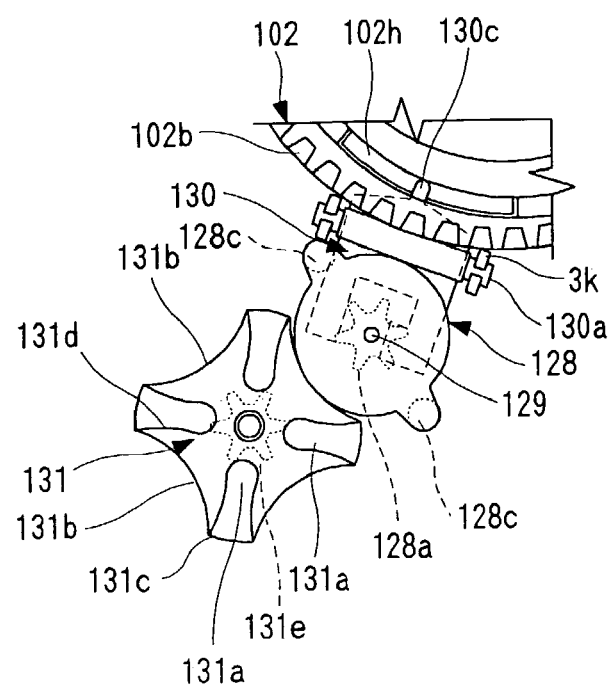
FIG. 23 is a top view of FIG. 22.
Figure 24:
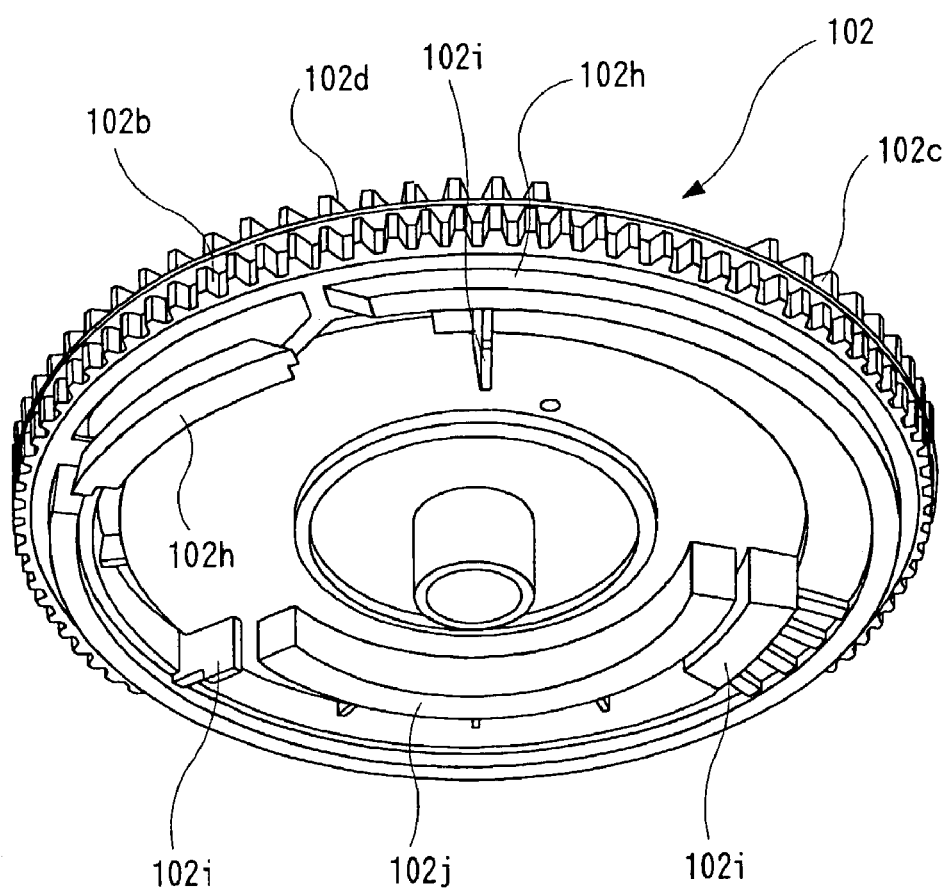
FIG. 24 is a perspective view showing a main gear taken from the below.

FIG. 19 is a top view showing the detail of the driving mechanism 100, FIG. 20 is a top view showing the detail of a main part of FIG. 19, FIGS. 21(*a*) and 21(*b*) are sectional views taken along line R—R of FIG. 20, FIG. 22 is a perspective view showing the relationship between the switching gear 128 and a Geneva gear 131, FIG. 23 is a top view of FIG. 22, and FIG. 24 is a perspective view showing the Geneva gear taken from the below.

In FIGS. 19 to 23, reference numeral 103 denotes a horizontal drive motor, which drives a driving gear 109 via a decelerating mechanism constituted by a motor pulley 104, a belt 105, a pulley gear 106, a first reduction gear 107, and a second reduction gear 108. A main gear 102 is driven by driving the driving gear 109. A gear 102*b* provided around the lower part of the main gear 102 is constantly engaged with the driving gear 109.

A gear 102*c* or 102*d* provided partially around the upper surface of the main gear 102 is engaged with a small gear 110*a* of a step-up gear 110 intermittently. Similarly, a gear 102*e* provided partially on the inside of the gear 102*c* or 102*d* is intermittently engaged with a small gear 111*a* of an inverting gear 111. Besides, when the small gear 111*a* of the inverting gear 111 is engaged with the gear 102*e*, the gear 102*c* or 102*d* and the small gear 110*a* of the step-up gear 110 are not engaged with each other.

Further, the small gear 110*a* of the step-up gear 110 and the large gear 111*b* of the inverting gear 111 are constantly engaged with each other. The step-up gear 110 is configured so that only a rotation direction is different but a reduction ratio is equal in the case where the small gear 110*a* is driven by the gear 102*c* or 102*d* and in the case where the small gear 110*a* is driven by the large gear 111*b* of the inverting gear 110 and the small gear 110*a* is driven by engaging the small gear 111*a* of the inverting gear 111 with the gear 102*e*.

Subsequently, the step-up gear 110 drives and rotates the gear 92*a* of the tray gear 92 in the tray driving unit 90 via an relay gear constituted by a first relay gear 112, a second relay gear 113, a large gear 114*a* of a front crown gear 114, and a tray relay gear 115 on a part where the tray relay gear 115 is constantly engaged. The tray relay gear 15 is formed as a long gear in a vertical direction so that engagement is maintained even when the tray driving gear 92 is moved vertically.

A crown gear 114*b* of the front crown gear 114 drives and rotates the lower gear 43*c* of the load gear 43 in the disk recording/reproducing section 60 via a relay gear constituted by a timing gear 116, a crown gear 117*a* and a large gear 117*b* of a rear crown gear 117, and a load relay gear 118 on a part where the load relay gear 118 is constantly engaged. The load relay gear 118 is formed as a long gear in a vertical direction so that engagement is maintained even when the load gear 43 is moved vertically.

With this configuration, the gear 41*b* of the tray gear 41 and the gear 43*a* of the load gear 43, which have the same module and are equal in the number of teeth, are interlocked with each other and rotated at the same speed.

Reference numeral 119 denotes a step-up lock lever which is rotatably attached to a shaft 101*c* of a large pitch plate 101 via a hole 119*a*. A cam 119*b* on one end of the speed up lock lever 119 is engaged with the lock cam 110*c* of the step-up gear 110 to specify the stopping position of the step-up gear 110. Moreover, a pin 119*c* on the other end of the speed up lock lever 119 is engaged with lock cams 102*f* and 102*g* provided on the main gear 102, and the main gear 102 controls the intermittence of specification of a stopping position of the step-up gear 110. Then, a spring part 119*d* is in contact with a rib 110*d* of a large pitch plate 101 and thus the step-up lock lever 119 is energized so as to rotate in the direction of arrow G (FIG. 19).

Reference numeral 120 denotes an elevation driving motor which drives a branch gear 126 via a decelerating mechanism constituted by a motor pulley 121, a belt 122, a pulley gear 123, a third reduction gear 124, and a fourth reduction gear 125. Thus, a select driving gear 127 is driven where a small gear 126*a* of the branch gear is engaged, and a rack 82*d* of the select rack 82 is driven on the tray selecting unit 80 where the select driving gear 127 is constantly, engaged, so that the select rack 82 is moved in the forward and backward directions.

Meanwhile, a large gear 126*b* of the branch gear 126 is engaged with a small gear 128*a* of a switch gear 128 and drives and rotates the switching gear 128. As shown in FIG. 21, the switching gear 128 is attached to a shaft 129 fixed between the mechanical base 3 and the large pitch plate 101 so as to rotate and move in a vertical direction. A guide 130*b* of a switching lever 130 is engaged with a groove 128*b* formed on the switching gear 128. The switching lever 130 is rotatably attached to a bearing 3k of the mechanical base 3 via a shaft 130a.

Further, a pin 130 provided on the other end of the switch lever 130 is engaged with the a driving cam 102h provided on the main gear 102, and the driving cam 102h is vertically moved by the rotation of the main gear 102, so that the switching lever 130 rotates about the shaft 130a in the direction of arrow I–J (FIG. 21). Thus, the switching gear 128 is moved vertically. The small gear 128a is formed with a long shape in the vertical direction so that engagement with the large gear 126b of the branch gear 126 is maintained even when the switching gear 128 is moved vertically.

As shown in FIGS. 21(a) and 22, when the switching gear 128 is moved downward, two driving pins 128c of the switching gear 128 are engaged with four cam grooves 131a formed on the Geneva gear 131 to drive the Geneva gear 131, so that the Geneva gear 131 is rotated intermittently. Meanwhile, as shown in FIGS. 21(b) and 23, when the switching gear 128 is moved upward, since the driving pin 128c of the switching gear 128 and the cam grooves 131a of the Geneva gear 131 have gaps above and below, engagement is not made. Even when the switching gear 128 is rotated, the Geneva gear 131 remains stopped without being rotated.

Further, in the Geneva gear 131, a circular arc cam 131b is formed between the cam grooves 131a. The circular arc cam 131b is engaged with the cylindrical part 128d of the switching gear 128, so that locking is made to prevent rotation when there is no need for rotation. As shown in FIG. 23, the circular arc cams 131b are formed so that both ends slightly spread wider than the arc. When the switching gear 128 moves vertically, even in a state in which the rotation stopping position of the switching gear 128 is slightly shifted, no interference occurs between both ends of the circular arc cam 131b, and a recessed portion 128e of the switching gear 128, which will be discussed later.

Further as described above, in the case of FIGS. 21(a) and 22 where the Geneva gear 131 is rotated, in order to permit ends 131c on the cam grooves 131a of the Geneva gear 131 to enter the inside of the driving pin 128c of the switching gear 128, a part of the cylindrical part 128d is notched to form a recessed portion 128e, so that interference is eliminated and the Geneva gear 131 can be rotated. At this point, the cam grooves 131a and the ends 131c of the Geneva gear 131 are interposed between the driving pin 128c of the switching gear 128 and a cylindrical upper surface 128f, which is a remaining part of the notched portion. Thus, even if a large load is applied, the driving pin 128c of the switching gear 128 and the cam grooves 131a of the Geneva gear 131 are disengaged from each other. In the case of FIG. 21(b), since the Geneva gear 131 is engaged with the cylindrical part 128d of the switching gear 128, locking is made without rotation.

Further, the cam groove 131a of the Geneva gear 131 has a chamfered part 131d so that the cam groove 131a increases in width as it is closer to the end 131c. With this configuration, as compared with the absence of the chamfered part 131d, even when a radius from the rotational center of the driving pin 128c of the engaged switching gear 128 is reduced, entry can be made to the cam groove 131a.

The gear 131e of the Geneva gear 131 is engaged with an elevating driving gear 132 to drive the elevating driving gear 132. Thus, the rack 71c is driven on the left elevation rack 71 of the elevating unit 70 which is constantly engaged with the elevating driving gear 132, and thus the left elevating, rack 71 is moved in the forward and backward directions.

The above-described switching gear 128, the Geneva gear 131, and so on constitute an example of a connecting/disconnecting unit 140 for connecting and disconnecting transmission on a part in a transmission line from the elevation driving motor 120 to the elevating unit 70. The connecting/disconnecting unit 140 is driven by the switching lever 130 which operates in response to rotation of the main gear 102 interlocked with the horizontal drive motor 103.

A stock switch 133 and a play switch 134 are located on a part of the mechanical base 3 below the back of the main gear 102. The stock switch 133 and the play switch 134 are engaged with a stock cam 102i and a play cam 102j formed on the back of the main gear 102, so that the rotating position of the main gear 102 is detected.

Besides, the components of the driving mechanism 100 are attached to and held by the mechanical base 3, the large pitch plate 101, and the small pitch plate 135. Moreover, the horizontal drive motor 103, the elevation driving motor 120, the open switch 46, the photosensor 83, the bottom switch 84, the stock switch 133, and the play switch 134 are attached to a printed board 136, are connected to one another, and are held.

Figure 25:
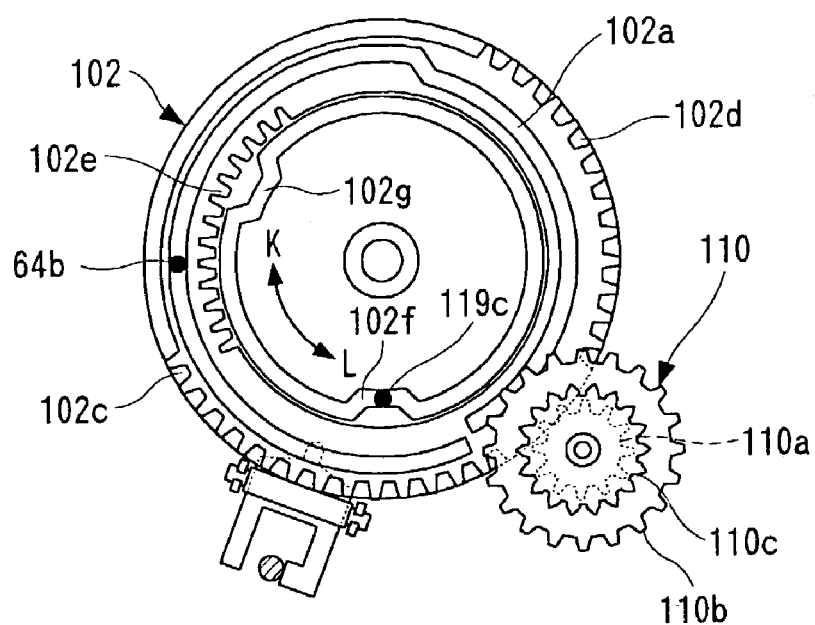
FIGS. 25(a) and 25(b) are detail views for explaining the states of the main gear.
Figure 25:
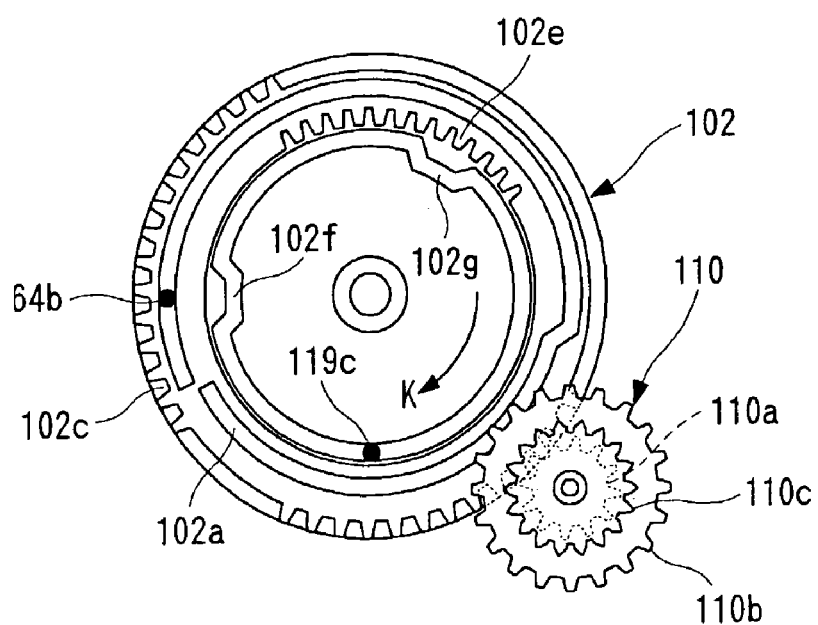
Figure 26:
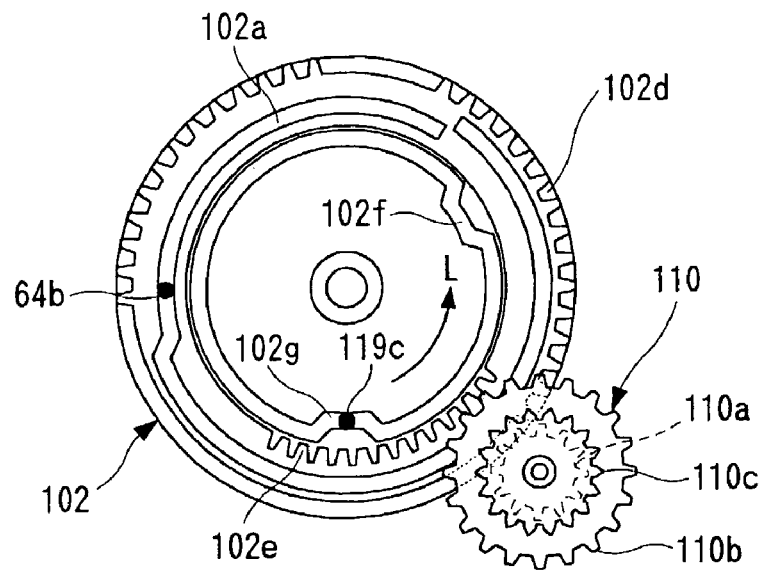
FIGS. 26(a) and 26(b) are detail views for explaining the states of the main gear.
Figure 26:
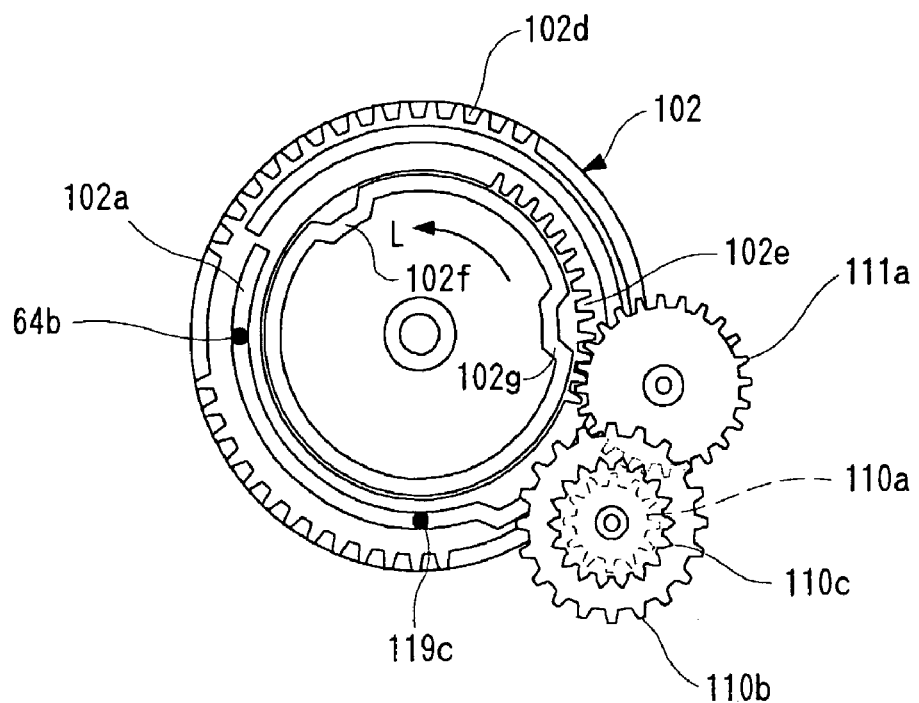
Figure 27:
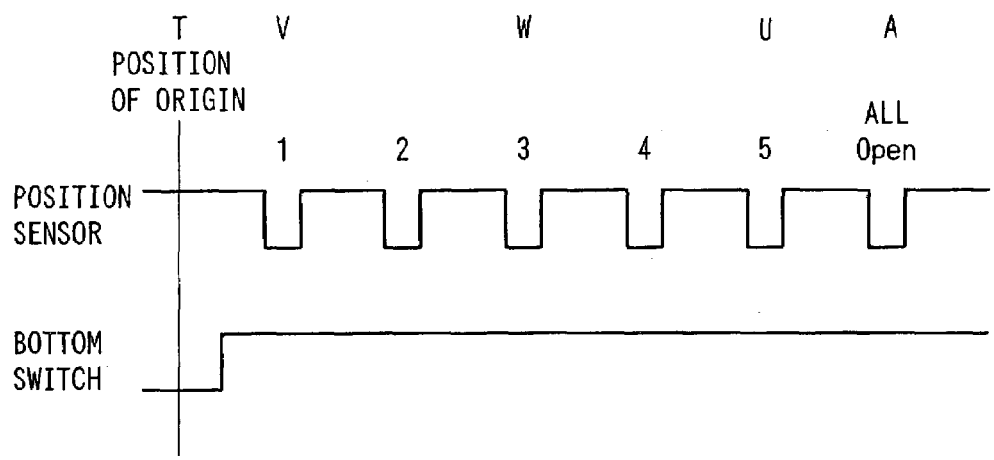
FIGS. 27(a) and 27(b) show whole timing charts.
Figure 27:
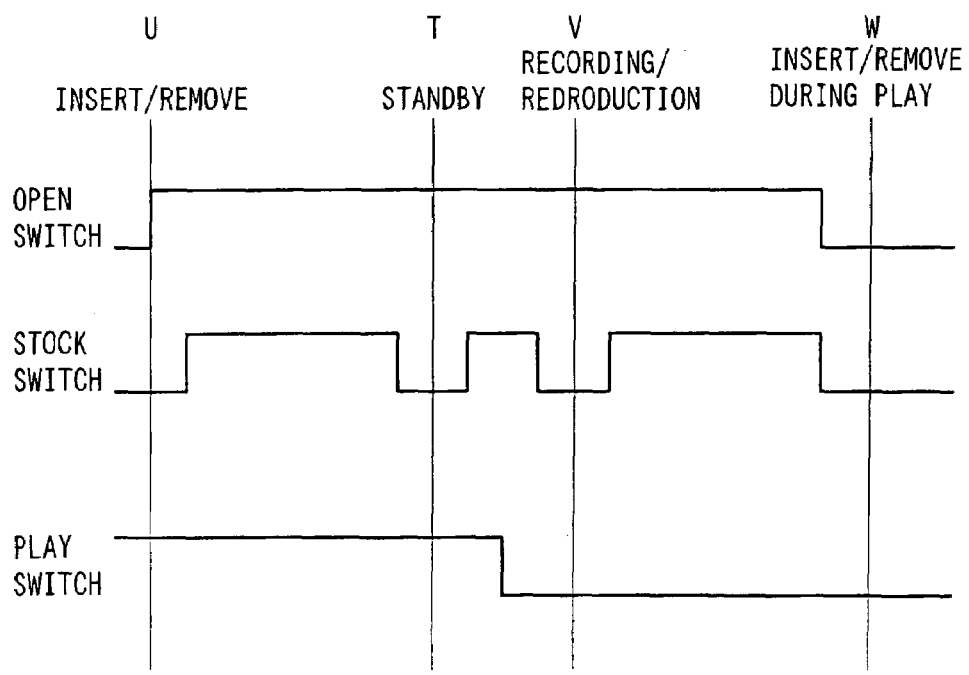

The following will discuss an operation of the disk changer having the above configuration. FIGS. 25 and 26 are detail drawings for explaining the state of the main gear 102, ad FIGS. 27(a) and 27(b) show whole timing charts.

First, as indicated by RESET of FIG. 2(a), on the standby position Y where the five trays 1 are all stored and aligned, when the select rack 82 of the tray selecting unit 80 is located on the position of origin at the rear end, that is, when the select rack 82 is located on T of FIG. 27(a) and T of FIG. 27(b)s an instruction is provided for, moving the tray 1 on the highest stage to the attaching/detaching position in order to load the disks 2a and 2b onto the tray 1 of the highest stage.

Then, the elevation driving motor 120 of the driving mechanism 100 rotates in CCW direction (FIG. 19) and drives the branch gear 126 via the decelerating mechanism. Thus, the select driving gear 127 engaged with a small gear 126a of the branch gear 126 is driven. The rack 82d of the select rack 82 on the tray selecting unit 80 is driven on a part which is constantly engaged with the select driving gear 127, so that the select rack 82 is moved forward.

The movement of the select rack 82 disengages the rib 82c from the bottom switch 84 and turns off the bottom switch 84. Subsequently, when the select rack 82 is further moved forward, the pin 81b is driven by the stepped cam 82a of the select rack 82 and the select guide 81 is moved upward. Thus, the tray driving unit 90 is also moved upward with respect to the hook 81a of the select guide 81. The tray driving unit 90 is engaged via the groove 92b of the tray driving gear 92.

Then, the sensor rib 82b is detected by the photosensor 83. As shown in FIG. 10(a), stopping is made on a position where the cam 41c of the tray gear 41 on the highest stage in the tray gear unit 40 and the driving cam 96a of the first tray driving cam 96 in the tray driving unit 90 are equal in height, that is, at U shown in FIG. 27(a).

Simultaneously, the switch gear 128 having the small gear 128a engaged with the large gear 126b of the branch gear 126 is driven. When the tray 1 is on the standby position Y, the main gear 102 is in the state of FIG. 25(a), and the pin 130c of the switching lever 130 is engaged with a part where the driving cam 102h is positioned above. Thus, the switching lever 130 rotates about the shaft 130a in the direction of arrow I (FIG. 21). Therefore, as shown in FIG. 21(a) and FIG. 22, the switching gear 128 is moved downward and the driving pin 128c of the switch gear 128 is, engaged with the cam groove 131a of the Geneva gear 131, and thus the Geneva gear 131 is driven and is intermittently rotated.

Since the elevating driving gear 132 engaged with the Geneva gear 131 is driven, the rack 71c of the left elevating rack 71 in the elevating unit 70 is driven, the elevating unit 70 being constantly engaged with the elevating driving gear 132, the left elevating rack 71 is moved forward, and the right elevating rack 73 interlocked via the elevating connection lever 72 is moved to the rear. Then, since the pins 10j and 10k of the elevating base 10 are driven by the stepped cam 71b of the left elevating rack 71 and the stepped cam 73b of the right elevating rack 73, the disk recording/reproducing section 60 is also moved upward and is stopped at the position suited to the height of the tray 1 located on the highest stage.

At this point, on the tray lock lever 85 on a stage other than the highest stage, the locking protrusion 85d is engaged with the cams 82e-2 to 82e-5 of the select rack 82 and rotates in the direction of arrow E (FIG. 13). Thus, the lock cam 85b is engaged with the recessed portion 1h of the tray 1 to prevent the tray 1 from moving in the forward and backward directions. Further, on the tray lock lever 85 on the highest stage, a releasing protrusion 85e is engaged with the cam 82f-1 of the select rack 82 and rotates in the direction of arrow F (FIG. 13). Thus, the lock cam 85b and the recessed portion 1h of the tray 1 are not engaged with each other and the tray 1 can move in the forward and backward directions.

Subsequently, the horizontal drive motor 103 of the driving mechanism 100 rotates in the direction of CW (FIG. 19) and drives the driving gear 109 via the decelerating mechanism. Thus, the man gear 102 is driven which is constantly engaged with the driving gear 109. The main gear 102 is in the state of FIG. 25(a) when the tray 1 is on the standby position Y. When the main gear 102 its driven to rotate in the direction of arrow K (FIG. 19), the lock cam 102f firstly presses the pin 119c to rotate the step-up, lock lever 119 in the direction of arrow H (FIG. 19) which is opposite from the energization force of the spring 119d part. Thus, the cam 119b and the lock cam 110c of the step up gear 110 are disengaged from each other and the step-up gear 11 can rotate.

Then, the gear 102d of the main gear 102 is engaged with the gear 102d of the main gear 102 and the step-up gear 110 is rotated, so, that the tray driving gear 92 of the tray driving unit 90 is rotated via thee relay gear. Thus, the first tray driving cam 96 fixed on the driving pipe 91 is also rotated simultaneously together with the tray driving gear 92 and the driving cam 96a drives the cam 41c of the tray gear 41 to rotate the tray gear 41, so that the tray 1 on the highest stage is moved forward.

At this point, the driving cam 102h is shifted from the upward direction to the downward direction in response to the rotation of the main gear 102, so that the switching lever 130 where the pin 130c is engaged is rotated about the shaft 130a in the direction of arrow J (FIG. 21). The switching gear 128 is moved upward as shown in FIGS. 21(b) and 23. Since the driving pin 128c of the switching gear 128 and the cam grooves 131a of the Geneva gear 131 are disengaged with each other because gaps are formed above and below. However, the cylindrical part 128d of the switching gear 128 and the circular arc cam 131b of the Geneva gear 131 maintain the engagement.

Then, when the switch cam 19 of the tray 1 is engaged with the cam 45b to rotate the open switch lever 45 in the direction of arrow C (FIG. 6) and the lever 45c turns on the open switch 46, the movement is stopped. Thus, the tray 1 on the highest stage is located on the attaching/detaching position X as shown in FIGS. 3 to 5 and OPEN5(b-5) of FIG. 2(b). At this point, the main gear 102 is in the state of FIG. 25(b), and the stock switch 133 and the play switch 134 that are engaged with the main gear 102 are in the state U shown in FIG. 27(b).

As shown in FIG. 10(a), the cams other than the driving cam 96a of the first tray driving cam 96, that is, the driving cam 92c of the tray driving gear 92, the driving cam 94a of the third tray driving cam 94, and the driving cam 95a of the second tray driving cam 95 are not engaged with any of the five cams 41c of the tray gear 41 without interference. This is because the driving cam 96a of the first tray driving cam 96 on the highest stage and the driving cam 95a of the second tray driving cam 95 are stacked with an interval of 3 mm and the other driving cams are stacked with an interval of 6 mm (e.g., an interval between the driving cam 95a of the second tray driving cam 95 and the driving cam 94a of the third tray driving cam 94). Hence, lamination is made so that the former value is about half the latter value.

The former value and the latter value are not limited to the above values. Other values are acceptable as long as the former value is smaller than the latter value and driving cams other than the driving cam 96a are not engaged with the cams of tray gears other than the tray gear 41 when the driving cam 96a on the top is engaged with the cam 41c of the tray gear 41. Further, instead of such a configuration, the following lamination is also acceptable an interval between the driving cam on the lowest stage and the driving cam in the previous stage is shorter than those of the other driving cams.

Additionally, even when vibration and impact are applied from the outside, the elevating unit 70 is not moved because the elevating unit 70 is locked by engagement of the cylindrical part 128d of the switching gear 128 and the circular arc cam, 131b of the Geneva gear 131 where the left elevating rack 71 is engaged via the elevating driving gear 132. Similarly, the disk recording/reproducing section 60 is not deviated in height.

Next, after the disk 2a (2b) is loaded on the step 1a (1b) of the tray 1 on the highest stage located on the attaching/detaching position X, when an instruction is provided for performing recording and reproduction on the disk 2a (2b), the horizontal drive motor 103 of the driving mechanism 100 is rotated in the opposite direction from moving the tray 1 from the standby position Y to the attaching/detaching position X, that is, in CCW direction (FIG. 19). Thus, the main gear 102 is rotated in the direction of arrow L (FIG. 19) via, the decelerating mechanism and the driving gear 109, the tray 1 is moved to the rear, and thus the tray 1 returns to the standby position Y and stops thereon as indicated by RESET of FIG. 2(a).

Then, the step-up lock lever 119 and the main gear 102 also return to the state of FIG. 25(a) and the switching gear 128 and the switching lever 130 return to the states of FIGS. 21(a) and 22, so that the main gear 102 and the step-up gear 110 are temporarily disengaged. However, since the horizontal drive motor 103 keeps rotating in CCW direction (FIG. 19), the main gear 102 further rotates in the direction of arrow L. Then, the lock cam 102f presses the pin 119c again and rotates the step-up lock lever 119 in the direction of arrow H (FIG. 19) which is opposite from the energization force of the spring part 119d. Thus, the cam 119b and the lock cam 110c of the step-up gear 110 are disengaged with each other and the step-up gear 110 can rotate.

Then, the gear 102c of the main gear 102 is engaged with the small gear 110a of the step-up gear 110 and thus the step-up gear 110 is rotated in the opposite direction from moving the tray 1 from the standby position Y to the attaching/detaching position X. The tray driving gear 92 of the tray driving unit 90, the first tray driving cam 96, and the tray gear 41 also rotate backward and thus the tray 1 on the highest stage starts moving to the rear.

At this point as well, since the driving cam 102h is shifted from the upward direction to the downward direction in response to the rotation of the main gear 102, the switching lever 130 where the pin 130c is engaged is rotated about the shaft 130a in the direction of arrow J (FIG. 21), the switching gear 128 is moved upward as shown in FIGS. 21(b) and 23, and the driving pin 128c of the switching gear, 128 and the cam grooves 131a of the Geneva gear 131 are disengaged because gaps are formed above and below. The cylindrical part 128d of the switching gear 128 and the circular arc cams 131b the Geneva gear 131 maintains the engagement.

Then, when the tray 1 is moved from the standby position Y to the rear, the gear 41b of the tray gear 41 and the rack 1d of the tray 1 are disengaged from each other. The rack 1e on the back of the left rear of the tray 1 is simultaneously engaged with the gear 43a of the load gear 43. At this point, on the load gear 43, the lower gear 43c is constantly engaged with the step-up gear 110 via the relay gear and is rotated in synchronization with the tray gear 41. Thus, the tray 1 is subsequently moved to the rear. Thereafter, although the tray gear 41 keeps rotating, interference does not occur because the gear 41b and the rack id of the tray 1 are disengaged from each other.

When the tray 1 is moved to the rear and the center of the loaded disk 2a (2b) is moved close to the center of the turntable 66a of the disk recording/reproducing section 60, the protruding rib 1f on the back of the tray 1 is engaged with the driving cam 44b of the tray switching lever 44 and rotates the tray switching lever 44 in the direction of arrow A (FIG. 6). Then, since the L-shaped cam 61a is driven by the pin 44c of the tray switching lever 44, the left sliding plate 61 is moved forward and the small rack 61d is engaged with the gear 43b of the load gear 43.

Meanwhile, the movement of the tray 1 to the recording/reproducing position Z is completed and the rack 1e and the gear 43a of the load gear 43 are disengaged from each other. Further, since the tray switching lever 44 is held so as not to be rotated because of the engagement of the pin 44c and the L-shaped cam 61a of the left sliding plate 61 which has moved forward, the tray 1 having the protrusion rib 1f engaged with the driving cam 44b of the tray switching lever 44 is also held without being moved in the forward and backward directions.

Then, when the left sliding plate 61 is further moved forward, the right sliding plate 62 interlocked via the connecting lever 63 is moved to the rear, and the elevating cam 61g of the left sliding plate 61 and the elevating cam 62b of the right sliding plate 62 drive the pins 66b and 66c of the recording/reproducing unit 66. Thus, the recording/reproducing unit 66 moves upward. Hence, the disk 2a (2b) loaded on the step 1a (1b) of the tray 1 is held on the turntable 66a together with the clamper 67 and thus the state of FIG. 16(b) is provided which permits the disk 2a (2b) to rotate.

At this point, since the pin 63e similarly drives the cam hole 68b in response to the rotation of the connecting lever 63, the clamp guide 68 is moved to the rear and disengaged from the clamper 67 and thus the clamper 67 enters a free state.

Thereafter, when the engagement of the pin 61c of the left sliding plate 61 is shifted to the long hole 63d on the cam hole 63b of the connecting lever 63, the rotation of the connecting lever 63 and the movement of the right sliding plate 62 are stopped and the state is held. Only the left sliding plate 61 is further moved forward.

When engagement of the left sliding plate 61 and the load gear 43 enters a position of transition from the small rack 61b and the gear 43b to the large rack 61e and the gear 43a, the square pin 65f on the back drives the cam 65c of the end detaching lever 65 and rotates the end, detaching lever 65 in the direction of arrow K (FIG. 14). Simultaneously, a detaching cam 102a of the main gear 102 rotates the center detaching lever in the direction of arrow M (FIG. 14). Hence, the engaged end detaching lever 65 further rotates in the direction of arrow K (FIG. 14) to permit the cam 65c to sandwich the square pin 61f and thus the left sliding plate 61 further moves forward.

Then, the large rack 61e and the gear 43a are disengaged from each other and the left sliding plate 61 is held while being located toward the forward direction on a part where the click spring 61d is engaged with the second tilting cam 10d of the elevating base 10. Thus, it is possible to obtain a gap between the large rack 61e and the gear 43a.

Then, as shown in FIG. 26(a), the small gear, 110a of the step-up gear 110 and the gear 102c of the main gear 102 are disengaged from each other, the rotation of the load gear 43 is stopped, the lock cam 102g of the main gear 102 presses the pin 119c, and the step-up lock lever 119 is rotated in the direction of arrow G (FIG. 19). Thus, the cam 119b and the lock cam 110c of the step-up gear 110 are engaged with each other and the step-up gear 110 enters a state in which the stopping position is specified.

Then, when stock cam 102i of the main gear 102 presses and turns on the stock switch 133, the movement is stopped. Thus, as indicated by DISC5(c-5) of FIG. 2©, the tray 1 on the highest stage is located on the recording/reproducing position Z and recording and reproduction are started on the disk 2a (2b).

At this point, the main gear 102 is in the state of FIG. 26(a), and the stock switch 133 and the play switch 134 that are engaged with the main gear 102 are in state V of FIG. 27(b). Further, as shown in FIG. 21(b), while the switching gear 128 is moved upward, the driving pin 128c of the switching gear 128 and the cam grooves 131a go out of engagement because gaps are formed above and below. However, the cylindrical part 128d of the switching gear 128 and the circular arc cam 131b of the Geneva gear 131 maintains the engagement. Therefore, the elevating unit 70 having the elevating rack 71 engaged with the Geneva gear 131 via the elevating driving gear 132 is locked without being moved even when vibration or impact is applied from the outside, and thus the disk recording/reproducing section 60 is not deviated in height.

Next, in order to load disk 2a (2b) on another tray 1, for example, an instruction is provided for moving the tray 1 on the lowest stage to the attaching/detaching position X, since the horizontal drive motor 103 of the, driving mechanism 100 rotates in CW direction (FIG. 19), the main gear 102 rotates in the direction of arrow K (FIG. 19) via the decelerating mechanism and the driving gear 109. Then, the lock cam 102g presses the pin 119c, and the step-up lock lever 119 is rotated in the direction of arrow H (FIG. 19) which is opposite from the energization of the spring part 119d. Hence, the cam 119b and the lock cam 110c of the step-up gear 110 are disengaged from each other and thus the step-up gear 110 can be rotated.

Then, the gear 102c of the main gear 102 is engaged with the small gear 110a of the step-up gear 110, and the step-up gear 110 rotates opposite to the above direction (when the tray 1 is moved from the standby position Y to the recording/reproducing position Z). Thus, the load gear 43, the tray driving gear 92 of the tray driving unit 90, the first tray driving cam 96, and the tray gear 41 also rotate backward.

Further, when the main gear 102 rotates in the direction of arrow K (FIG. 19), since the detaching cam 102a of the main gear 102 rotates the center detaching lever 64 in the direction of arrow N (FIG. 14), the engaged end detaching lever 65 rotates in the direction of arrow L (FIG. 14), the cam 65c drives the square pin 61f to move the left sliding plate 61 in the backward direction, and the large rack 61e is engaged with the gear 43a of the load gear 43.

Thereafter, the left sliding plate 61 is moved to the rear by the rotation of the load gear 43. When the engagement enters a position of transition from the large rack 61e and the gear 43a to the small rack 61b and the gear 43b, the pin 61c of the left sliding plate 61 drives the cam hole 63b of the connecting lever 63 and thus the right sliding plate 62 interlocked via the connecting lever 63 is moved forward. Thus, the recording/reproducing unit 66 is moved in the downward direction which is opposite from the above direction (when the tray 1 is moved from the standby position Y to the recording/reproducing position Z).

Then, the disk 2a (2b) is returned to the step 1a (1b) of the tray 1 and the pin 63e simultaneously drives the cam hole 68b in response to the rotation of the connecting lever 63. Thus, the clamp guide 68 is moved forward, and the tilting cam 68a on the front end is engaged with the damper 67 to move the damper 67 upward.

Then, when the left sliding plate 61 is further moved backward, since the pin 44c of the tray switching lever 44 is driven where the L-shaped cam 61a is engaged, the tray switching lever 44 rotates in the direction of arrow B (FIG. 6) to drive the protruding rib if on the back of the tray 1 where the driving cam 44b is engaged. Thus, the tray 1 starts moving in a forward direction. Then, the rack le on the back of the left rear of the tray 1 is engaged with the gear 43a of the load gear 43 and thus the tray 1 further moves forward.

At this point, the left sliding plate 61 moves backward when the small rack 61b and the gear 43b of the load gear 43 are disengaged from each other and the click spring 61d is engaged with the first tilting cam 10c of the elevating base 10. The left sliding plate 61 is stopped in a state in which a gap is obtained between the small rack 61b, and the gear 43b of the load gear 43. The L-shaped cam 61a and the pin 44c of the tray switching lever 44 are engaged with each other, so that the tray switching lever 44 is held so as not to be rotated.

Thereafter, when the tray 1 further moves forward, the gear 43a of the load gear 43 and the rack 1e on the back of the left rear of the tray 1 are disengaged from each other, and the rack 1d of the tray 1 is simultaneously engaged with the gear 41b of the tray gear 41 and is moved forward. The tray 1 returns to the standby position Y and stops thereon as indicated by RESET of FIG. 2(a). Then, the step-up lock lever 119 and the main gear 102 also return to the state of FIG. 25(a) and the switching gear, 128 and the switching lever 130 also return to the states of FIGS. 21(a) and 22, so that the main gear 102 and the step-up gear 110 are disengaged from each other. Thus, the rotations of the load gear 43, the tray driving gear 92 of the tray driving unit 90, the first tray driving cam 96, and the tray gear 41 are also stopped.

Then, the elevation driving motor 120 of the driving mechanism 100 rotates in CW direction (FIG. 19) which is opposite from the above direction and drives the branch gear 126 via the decelerating mechanism. Thus, the select driving gear 127 engaged with the small gear 126a of the branch gear 126 is driven and the rack 82d of the select rack 82 in the tray selecting unit 80 is driven on a part which is constantly engaged with the select driving gear 127, so that the select rack 82 is moved backward.

Then, when the select rack 82 is further moved backward, the pin 81b is driven by the stepped cam 82a of the select rack 82 and the select guide 81 is moved downward. Hence, the hook 81a and the tray driving unit 90 where the groove 92b of the tray driving gear 92 is engaged are also moved downward. Then, the sensor rib 82b is detected by the photosensor 83, and as shown in FIG. 10(b), stopping is made at a position where the cam 41c of the tray gear 41 on the lowest stage in the tray gear unit 40 is equal in height to the driving cam 96a of the first tray driving cam 96 in the tray driving unit 90, that is, at V of FIG. 27(a).

At this point, the switching gear 128 is simultaneously driven in which the large gear 126b of the branch gear 126 and the small gear 128a are engaged with each other. As, described above, since the switching gear 128 is moved downward as shown in FIG. 21(a), the driving pin 128c of the switching gear 128 is engaged with the cam groove 131a of the Geneva gear 131 to drive the Geneva gear 131 and makes rotation intermittently.

Then, since the elevating driving gear 132 engaged with the Geneva gear 131 is driven, the rack 71c of the left elevating rack 71 in the elevating unit 70 is driven on apart which is constantly engaged with the elevating driving, gear 132, the left elevating rack 71 is moved backward, and the right elevating rack 73 interlocked via the elevating connecting lever 72 is moved forward at the same time. The pins 10j and 10k of the elevating base 10 are driven by the stepped cam 71b of the left elevating rack 71 and the stepped cam 73b of the right elevating rack 73. Thus, the disk recording/reproducing section 60 is also moved downward and stopped at a position suited to the height of the tray 1 on the lowest stage.

At this point, on the tray lock lever 85 on a stage other than the lowest stage, the locking protrusion 85d is engaged with the cams 82e-1 to 82e-4 of the select rack 82 and rotates the tray lock lever 85 in the direction of arrow E (FIG. 13). Thus, the lock cam 85b is engaged with the recessed portion 1h of the tray 1 to prevent the tray 1 from moving in the forward and backward directions. On the tray lock lever 85 on the lowest stage, the releasing protrusion 85e is engaged with the cam 82f-5 of the select rack 82 and rotates the tray lock lever 85 in the direction of arrow F (FIG. 13). Thus, the lock cam 85b and the recessed portion 1h of the tray 1 are not engaged with each other, and the tray 1 can move in the forward and backward directions.

Subsequently, the horizontal drive motor 103 of the driving mechanism 100 rotates in the direction of CW (FIG. 19), and as described above, the horizontal drive motor 103 moves the tray 1 on the lowest stage to the attaching/detaching position X and stops the tray 1 thereon as indicated by OPEN1(b-1) of FIG. 2(b). Thus, the disk 2a (2b) can be loaded on the step 1a (1b) of the tray 1 on the lowest stage.

Thereafter, as indicated by OPEN1(b-1) to OPEN5(b-5) of FIG. 2(b), the trays 1 on all the other addresses are moved by the similar operation to the attaching/detaching position X for each address, so that the disk 2a (2b) can be loaded or ejected.

Figure 2:
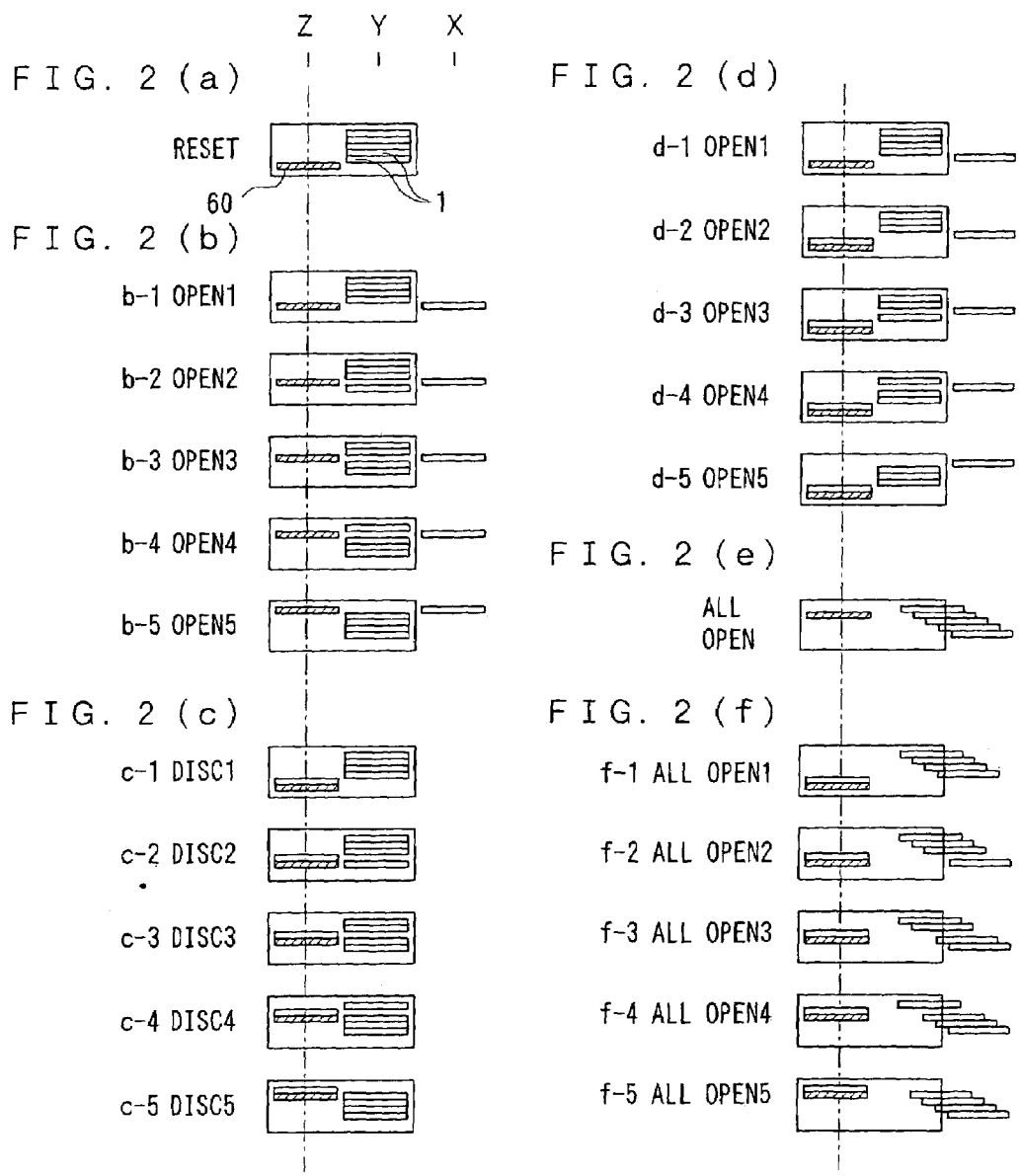
FIGS. 2(a) to 2(f) are schematic left side views for explaining the operations of disks.

Next, in the case where the recorded or reproduced disk 2a (2b) is exchanged with another disk 2a (2b) (corresponding to FIG. 2©), for example, as indicated by DISC5(c-5) of FIG. 2©, when an instruction is provided for recording or reproducing the disk 2a (2b) on the tray 1 of the third tray from a state in which the disk 2a (2b) on the tray 1 of the highest stage is recorded or reproduced, the horizontal drive motor 103 of the driving mechanism 100 rotates in CW direction (FIG. 19) and the tray 1 is returned to the standby position Y and is stopped thereon by the similar operation. Then, the step-up lock lever 119 and the main gear 102 also return to the state of FIG. 25(a), and the switching gear 128 and the switching lever 130 also return to the states of FIGS. 21(a) and 22.

Subsequently, the elevation driving motor 120 of the driving mechanism 100 rotates in CW direction (FIG. 19) and is stopped by the similar operation at a position where the cam 41c of the tray gear 41 on the third stage in the tray gear unit 40 is equal in height to the driving cam 96a of the first tray driving cam 96 in the tray driving unit 90, that is, at W of FIG. 27(a)as shown in FIG. 10(c).

Simultaneously, the switching gear 128 is similarly driven by the branch gear 126. Since the switching gear 128 is moved downward as shown in FIG. 21(a), the driving pin 128c of the switching gear. 128 is engaged with the cam groove 131a of the Geneva gear 131 to drive and rotate the Geneva gear 131 intermittently. Thus, the disk recording/reproducing section, 60 is also moved downward by the similar operation and is stopped at a place suited to the height of the tray 1 on the third stage.

At this point, on the tray lock lever 85 on a stage other than the third stage, the locking protrusion 85d is engaged with the cams 82e-1 and 82e-2 and 82e-4 and 82e-5 of the select rack 82 and rotates the tray lock lever 85 in, the direction of arrow E (FIG. 13). Thus, the lock cam 85b is engaged with the recessed portion 1h of the tray 1 to prevent the tray 1 from moving in the forward and backward directions. On the tray lock lever 85 on the third stage, the releasing protrusion 85e is engaged with the cam 82f-3 of the select rack 82 and rotates the tray lock lever 85 in the direction of arrow F (FIG. 13). Thus, the lock cam 85b and the recessed portion 1h of the tray 1 are not engaged with each other and the tray 1 can move in the forward and backward directions.

Subsequently, the horizontal drive motor 103 of the driving mechanism 100 rotates in CCW direction (FIG. 19) and moves the tray 1 to the recording/reproducing position Z and stops the tray 1 thereon as indicated by DISC(c-3) of FIG. 2©, and recording and reproduction are started on the disks 2a (2b) on the tray 1 of the third stage.

Thereafter, as indicated by DISC1(c-1) to DISC5(c-5) of FIG. 2©, the disks 2a (2b) on the trays 1 of all the other addresses are exchanged for each address and recording/reproduction can be performed by the similar operation.

Next, during recording/reproduction of the disk 2a (2b), except for the disk 2a (2b) on the recorded or reproduced tray 1, the disks 2a (2b) on the trays 1 of all the other addresses are moved to the attaching/detaching position X for each address without interrupting the recording/reproduction, and the disks 2a (2b) are loaded or ejected (corresponding to. FIG. 2(d)). In this case, for example, as indicated by DISC(c-1) of FIG. 2©, when an instruction is provided for moving the tray 1 on the highest stage to the attaching/detaching position X from a state in which the disk 2a (2b) on the tray 1 of the lowest stage is recorded or reproduced, the elevation driving motor 120 of the driving mechanism 100 rotates in CCW direction (FIG. 19) and drives the branch gear 126 via the decelerating mechanism. Thus, the select driving gear 127 engaged with the small gear 126a of the branch gear, 126 is driven, and the rack 82d of the select rack 82 in the tray selecting unit 80 is driven at a place which is constantly engaged with the select driving gear 127, so that the select track 82 is moved forward.

Then, when the select track 82 is further moved forward, the pin 81b is driven by the stepped cam 82a of the select track 82 and the select guide 81 is moved upward. Thus, the tray driving unit 90 where the hook 81a and the groove 92b of the tray driving gear 92 are engaged is also moved upward. Then, the sensor rib 82b is detected by the photosensor 83, and as shown in FIG. 10(a), stopping is made at a position where the cam 41c of the tray gear 41 on the highest stage in the tray gear unit 40 is equal in height to the driving cam 96a of the first tray driving cam 96 in the tray driving unit 90, that is, at U of FIG. 27(a).

At this point, the switching gear 128 where the large gear 126b and the small gear 128a of the branch gear 126 are engaged is driven at the same time. The switching gear 128 is moved upward as shown in FIG. 21(b), and the driving pin 128c of the switching gear 128 and the cam grooves 131a of the Geneva gear 131 have gaps above and below without engagement. Thus, even when the switching gear 128 rotates, the Geneva gear 131 remains stopped without rotation. Therefore, on the elevating driving gear 132 engaged with the Geneva gear 131 and a part engaged with the elevating driving gear 132, the rack 71c of the left elevating rack 71 in the elevating unit 70 also remains stopped and the elevating unit 70 is not moved, and thus the disk recording/reproducing section 60 is held at the height of the tray 1 on the lowest stage, so that recording/reproduction of the disk 2a (2b) is maintained.

Besides, since the cylindrical part 128d of the switching gear 128 and the circular arc cam 131b maintains the engagement, the elevating unit 70 having the left elevating rack 71 engaged with the Geneva gear 131 via the elevating driving gear 132 is locked so that the elevating unit 70 does not move even when vibration or impact is applied from the outside. Hence, the disk recording/reproducing section 60 is not deviated in height.

Further, at this point, on the tray lock lever 85 on a stage other than the highest stage, the locking protrusion 85d is engaged with the cams 82e-2 to 82e-5 of the select rack 82 and rotates the tray lock lever 85 in the direction of arrow E (FIG. 13). The lock cam 85b is engaged with the recessed portion 1h of the tray 1 to prevent the tray 1 from moving in the forward and backward directions. On the tray lock lever 85 on the highest stage, the releasing protrusion 85e is engaged with the cam 82f-1 of the select lock 82 and rotates the tray lock lever 85 in the direction of arrow F (FIG. 13). Thus, the lock cam 85b and the recessed portion 1h of the tray 1 are not engaged with each other, and the tray 1 can move in the forward and backward directions.

Subsequently, since the horizontal drive motor 103 of the driving mechanism 100 rotates in CCW direction (FIG. 19), the main gear 102 rotates in the direction of arrow. L (FIG. 19) via the decelerating mechanism and the driving gear 109 from the state of the FIG. 23©. Then, the lock cam 102g presses the pin 119c and rotates the step-up lock lever 119 in the direction of arrow H (FIG. 19) which is opposite from energization of the spring part 119d. Thus, the cam 119b and the lock cam 110c of the step-up gear 110 are disengaged from each other, so that the step-up gear 110 can rotate.

Then, the gear 102e of the main gar 102 is engaged with the small gear 111a of the inverting gear 111 where the small gear 110a and the large gear 111b of the step-up gear 110 are constantly engaged, and the inverting gear 111 and the step-up gear 110 are rotated. Thus, the tray driving gear 92 of the tray driving unit 90, the first tray driving cam 96, and the tray gear 41 are also rotated via the relay mechanism, so that the tray 1 on the highest stage is moved forward. Although the load gear 43 also rotates at the same time, the load gear 43 is disengaged from the tray 1 on the lowest stage at the recording/reproducing position Z, resulting in no interference.

At this point, since the step-up gear 110 is driven from the main gear 102 via the inverting gear 111, even when the main gear 102 rotates in the direction of arrow L (FIG. 19 or 25), the tray 1 is moved forward.

At this point, since the driving cam 102h of the main gear 102 is not changed from the downward direction, the switching gear 128 is moved upward as shown in FIG. 21(b). Although the driving pin 128c of the switching gear 128 and the cam grooves 131a of the Geneva gear 131 are not engaged with each other, the cylindrical part 128d of the switching gear 128 and the circular arc cam 131b maintains the engagement.

Then, when the switch cam 1g of the tray 1 is engaged with the cam 45b to rotate the open switch lever 45 in the direction of arrow C (FIG. 6) and the, lever 45c presses and turns on the open switch 46, the movement is stopped. Thus, as indicated by OPEN5(d-5) of FIGS. 5 and 2(d), the tray 1 on the highest stage is located on the attaching/detaching position X. At this point, the main gear 102 enters the state of FIG. 26(b), and the stock switch 133 and the play switch 134 that are engaged with the main gear 102 enter the state W of FIG. 27(b). Then, the disk 2a (2b) can be loaded or ejected on the step 1a (1b) of the highest stage.

Subsequently, in order to load or eject the disk 2a (2b) on another tray 1 while maintaining the recording/reproduction of the disk 2a (2b), for example, when an instruction is provided for moving the tray 1 on the third stage to the attaching/detaching position X, the horizontal drive motor 103 of the driving mechanism 100 rotates in CW direction (FIG. 19) Thus, the main gear 102 rotates in the direction of arrow K (FIG. 19) via the decelerating mechanism and the driving gear 109. Therefore, the inverting gear 111 and the step-up gear 110 also rotate in the opposite direction. Hence, the tray driving gear 92 of the tray driving unit 90, the first tray driving cam 96, and the tray gear 41 also rotate in the opposite direction via the relay mechanism, and thus the tray 1 on the highest stage is moved backward, is returned to the standby position Y, and is stopped thereon. Then, the step-up lock lever 119 and the main gear 102 also return to the state of FIG. 26(a), and the main gear 102 and the inverting gear 111 are also disengaged from each other.

Subsequently, the elevation driving motor 120 of the driving mechanism 100 rotates in CW direction (FIG. 19), and the select rack 82 is moved backward in the opposite direction by the similar operation. As shown in FIG. 100, stopping is made at a position where the cam 41c of the tray gear 41 on the third stage in the tray gear unit 40 is equal in height to the driving cam 96a of the first tray driving cam 96 in the tray driving unit 90, that is, at W of FIG. 27(a).

At this point, on the tray lock lever 85 on a stage other than the third stage, the locking protrusion 85d is engaged with the cams 82e-1 and 82e-2 and 82e-4 and 82e-5 of the select track 82, and rotates the tray lock lever 85 in the direction of arrow E (FIG. 13). Thus, the lock cam 85 is engaged with the recessed portion 1h of the tray 1 to prevent the tray 1 from moving in the forward and backward directions. The tray lock lever 85 on the third stage has the releasing protrusion 85e engaged with the cam 82f-3 of the select rack 82 and rotates the tray lock lever 85 in the direction arrow F.(FIG. 13). Thus, the lock cam 85b and the recessed portion 1h of the tray 1 are not engaged with each other, and the tray 1 on the third stage can move in the forward and backward directions.

Then, since the horizontal drive motor 103 of the driving mechanism 100 rotates in CCW direction (FIG. 19), the tray 1 on the third stage is moved forward by the similar operation. As indicated by OPEN3(d-3) of FIG. 2(d), the tray 1 on the third stage is located on the attaching/detaching position X. Besides, the switching gear 128 similarly stays upward as shown in FIG. 21(b). Then, the disk 2a (2b) can be loaded or ejected on the step 1a (1b) of the tray 1 on the third stage.

Thereafter, as indicated by OPEN2(d-2) to OPEN5(d-5) of FIG. 2(d), except for the disk 2a (2b) on the tray 1 on a recorded or reproduced address, the trays 1 on all the other addresses are moved to the attaching/detaching position X for each address to load or eject the disks 2a (2b) thereon.

Next, when direct visual confirmation is made on which tray 1 has the disk 2a (2b) or which tray 1 has which disk 2a (2b) (corresponding to FIG. 2(e)), for example, as indicated by RESET of FIG. 2(a), an instruction of all open is provided at the standby position Y where the five trays 1 and disks 2a (2b) are all stored and aligned in a state in which the select rack 82 of the tray selecting unit 80 is located on the original position serving as the rear end, that is, T of FIG. 27(a) and T of FIG. 27(b).

Then, the elevation driving motor 120 of the driving mechanism 100 rotates in CCW direction (FIG. 19) and the branch gear 126 is driven via the decelerating mechanism. Thus, the select driving gear 127 engaged with the small gear 126a of the branch gear 126 is driven, the rack 82d of the select rack 82 in the tray selecting unit 80 is driven, and the select rack 82 is moved forward.

The movement of the select rack 82 permits the rib 82c and the bottom switch 84 to be disengaged from each other and the bottom switch 84 is turned off. Then, when the select rack 82 moves forward, the pin 81b is driven by the stepped cam 82a of the select rack 82 to move the select guide 81 upward, and thus the tray driving unit 90 engaged via the groove 92b of the tray driving gear 92 is also moved upward with respect to the hook 81a of the select guide 81.

Then the sensor rib 82b is detected by the photosensor 83. As shown in FIG. 8, stopping is made at a position where the cams 41c of the tray gears 41 on all the stages in the tray gear unit 40 are equal in height to the driving cam 92c of the corresponding tray driving gear 92 in the tray driving unit 90 and the driving cams 94a and 95a of the tray driving cams 94 and 95, that is, at A of FIG. 27(a). At this moment, the first tray driving cam 96 is located on a non-active position above.

Simultaneously, the switching gear 128 is driven where the large gear 126b and the small gear 128a of the branch gear 126 are engaged. When the tray 1 is on the standby position Y, the main gear 102 is in the state of FIG. 25(a). Since the place where the driving cam 102h is positioned upward is engaged with the pin 130c of the switching lever 130, the switching lever 130 rotates about the shaft 130a in the direction of arrow I (FIG. 21). Therefore, the switching gear 128 is moved downward as shown in FIGS. 21(a) and 22 and the driving pin 128c of the switching gear 128 is engaged with the cam groove 131a of the Geneva gear 131, and thus the Geneva gear 131 is driven and rotated intermittently.

Since the elevating driving gear 132 engaged with the Geneva gear 131 is driven, the rack 71c of the left elevating rack 71 is driven in the elevating unit 70 which is constantly engaged with the elevating driving gear 132, the left elevating rack 71 is moved forward, and the right elevating rack 73 interlocked via the elevating connecting lever 72 is simultaneously moved to the rear.

Then, the stepped cam 71b of the left elevating rack 71 and the stepped cam 73b of the right elevating rack 73 drive the pins 10j and 10k of the elevating base 10. Thus, the disk recording/reproducing section 60 also moves upward, and the movement of the elevating connecting lever 72 and the right elevating rack 73 is completed at a place suited to the tray 1 on the highest stage. Only the left elevating rack 71 further moves forward in accordance with an amount of movement of the select rack 82 from U of FIG. 27(a) to A of FIG. 27(a), so that no interference occurs even when the select rack 82 and the left elevating rack 71 are connected in each gear line. Additionally, since the stepped cam 71b of the left elevating rack 71 is flat during this period, the disk recording/reproducing section 60 is not changed in height.

At this point, on the tray lock lever 85 of each stage, the releasing protrusions 85e-1 to 85e-5 are engaged with the cams 82f-1 to 82f-5 of the select track 82 and rotate in the direction of arrow F (FIG. 13). Hence, the lock cam 85b and the recessed portion 1h of the tray 1 are not engaged with each other and thus all the trays 1 can move in the forward and backward directions.

Subsequently, the horizontal drive motor 103 of the driving mechanism 100 rotates in CW direction (FIG. 17) and drives the driving gear 109 via the decelerating mechanism. Hence, the main gear 102 is driven which is constantly engaged with the driving gear 109. The main gear 102 is in the state of FIG. 25(a) when the tray 1 is located on the standby position Y. When the main gear 102 is driven and rotated in the direction of arrow K (FIG. 19), the lock cam 102f firstly presses the pin 119c and rotates the step-up lock lever 119 in the direction of arrow H (FIG. 19) which is opposite from the energization force of the spring part 119d. Thus, the cam 119b and the lock cam 110c of the step-up gear 110 are disengaged from each other, and the step-up gear 110 can rotate.

Then, the gear 102d of the main gear 102 is engaged with the small gear 110a of the step-up gear 110. The rotation of the step-up gear rotates the tray driving gear 92 of the tray driving unit 90 via the relay mechanism. Then, only the tray gear 41 on the, first stage (the lowest stage) is rotated that is engaged via the cam. 41c with the driving cam 92c formed on the tray driving gear 92, and only the tray 1 on the first stage (the lowest stage) starts moving from the standby position Y to the attaching/detaching position X. The tray 1 is engaged with the gear 41b of the tray gear 41 via the rack 1d.

At this point, since the driving cam 102h is moved from the upward direction to the downward direction in response to the rotation of the main gear 102, the switching lever 130 where the pin 130c is engaged rotates about the shaft 130a in the direction of arrow J (FIG. 21). The switching gear 128 moves upward as shown in FIGS. 21(b) and 23. While the driving pin 128c of the switching gear 128 and the cam grooves 131a of the Geneva gear 131 are disengaged from each other because gaps are formed above and below, the cylindrical part 128d of the switching gear 128 and the circular arc cam 131 of the Geneva gear 131 maintain the engagement.

When the tray driving gear 92, that is, the driving cam 92c on the first stage (the lowest stage) rotates 240° (360°−60°× 2), the protrusion 92d formed on a part of the contacted surfaces of the tray driving gear 92 drives the protrusion 94b of the adjacent third tray driving cam 94. Thus, the third tray driving cam 94 on the second stage is rotated.

Then, the tray gear 41 on the second stage is rotated that is engaged via the cam 41c with the driving cam 94a formed on the third tray driving cam 94. The tray 1 on the second stage also starts moving from the standby position Y to the attaching/detaching position X. The tray 1 is engaged with the gear 41b of the tray gear 41 via the rack 1d. Subsequently, when the third tray driving cam 94 on the second stage rotates 240° (360°−60°×2), the third tray driving cam 94 on the third stage and the tray gear 41 on the third stage are rotated in a like manner, and the tray 1 on the third stage also starts moving from the standby position Y to the attaching/detaching position X. Thereafter, all the trays 1 are similarly moved to the attaching/detaching position X.

Then, the switch cam 1g of the tray 1 on the first stage (the lowest stage) is engaged with the cam 45b to rotate the open switch lever 45 in the direction of arrow C (FIG. 6) and the lever 45c presses and turns on the open switch 46, so that the movement is stopped. At this point, since the tray 1 on the second stage starts moving after the tray 1 on the first stage (the lowest stage) and the tray 1 on the third stage starts moving after the tray 1 on the second stage, the trays 1 are arranged like steps as indicated by ALL OPEN in FIG. 2(e).

Therefore, in a state in which all the trays 1 are moved from the standby position Y to the attaching/detaching position X, the main surfaces of the all the disks 2a (2b) are partially exposed, and thus it is possible to directly perform visual confirmation on which tray 1 has the disk 2a (2b) or which tray 1 has which disk 2a (2b).

Thereafter, when an instruction is provided for returning the stepped trays 1 to the original. [RESET of FIG. 2(a)], the horizontal motor 103 of the driving mechanism 100 rotates oppositely from the direction of moving the trays 1 from the standby position Y to the attaching/detaching position X, that is, in CCW direction (FIG. 19). Thus, the main gear, 102 rotates in the direction of arrow L (FIG. 19) via the decelerating mechanism and the driving gear 109, so that the tray driving gear 92 of the tray driving unit 90 is rotated backward via the relay mechanism.

Then, only the tray gear 41 on the first stage. (the lowest stage) that is engaged with the tray driving gear, 92 is firstly rotated backward, and only the tray 1 on the first stage (the lowest stage) that is engaged with the tray gear 41 starts moving, from the attaching/detaching position X to the standby position Y. Then, when the tray driving gear 92 rotates 240° (360°−60°×2), the protrusion 92d formed on a part of the contacted surfaces of the tray driving gear 92 drives the protrusion 94b of the adjacent third tray driving cam 94. Thus, the third tray driving cam 94 on the second stage is rotated backward.

Then, the tray gear 41 on the second stage that is engaged with the third tray driving cam 94 is rotated backward in an integral manner, and the tray 1 on the second stage that is engaged with the tray gear 41 also starts moving from the attaching/detaching position X to the standby position Y. Subsequently, when the third tray driving cam 94 on the second stage rotates 240° (360°−60×2°), similarly the third tray driving cam 94 on the third stage and the tray gear 41 on the third stage are rotated backward, and the tray 1 on the third stage also starts moving from the attaching/detaching position X to the standby position Y. Thereafter, all the trays 1 are similarly moved toward the standby position Y. Thus, the trays return to the standby position Y and stop thereon as indicated by RESET in FIG. 2(*a*).

Then, the step-up lock lever 119 and the main gear 102 also return to the state of FIG. 25(*a*), and the switching gear 128 and the switching lever 130 also return to the states of FIGS. 21(*a*) and 22.

Subsequently, the elevation driving motor 120 of the driving mechanism 100 rotates in CW direction (FIG. 19) which is opposite from the above direction, the select track 82 is moved to the rear and the tray driving unit 90 and the disk recording/reproducing section 60 are moved downward by the similar operation in the opposite direction. Thus, return is made to the states of T in FIG. 27(*a*), T in FIG. 27(*b*), and RESET in FIG. 2(*a*).

Next, during recording and reproduction of the disk 2*a* (2*b*), when direct visual confirmation is made on which of the other trays 1 has the disk 2*a* (2*b*) or which tray 1 has which disk 2*a* (2*b*) without interrupting the recording and reproduction (corresponding to FIG. 2(*f*)) except for the recorded or reproduced disk 2*a* (2*b*) on the tray 1, for example, as indicated by DISC(c-3) of FIG. 2©, an instruction of all open is provided from a state in which the disk 2*a* (2*b*)on the tray 1 of the third stage is recorded or reproduced.

Then, since the elevating motor 120 of the driving mechanism 100 rotates in CCW direction (FIG. 19) and drives the branch gear 126 via the decelerating mechanism, the select driving gear 127 engaged with the small gear 126*a* of the branch gear 126 is driven, and the rack 82*d* of the select rack 82 in the tray selecting unit 80 is driven at a place which is constantly engaged with the select driving gear 127, so that the select rack 82 is moved forward.

Then, when the select rack 82 is further moved forward, the pin 81*b* is driven by the stepped cam 82*a* of the select rack 82 and the select guide 81 is moved upward. Thus, the tray driving unit 90 where the hook 81*a* and the groove 92*b* of the tray driving gear 92 are engaged is also moved upward. Then, the sensor rib 82*b* is detected by the photosensor 83. As shown in FIG. 8, stopping is made at a position where the cams 41*c* of the tray gears 41 on all the stages in the tray gear unit 40 are equal in height to the driving cam 92*c* of the corresponding tray driving gear 92 in the tray driving unit 90 and the driving cams 94*a* and 95*a* of the tray driving cams 94 and 95, that is, at A of FIG. 27(*a*). At this moment, the first tray driving cam 96 is located on a non-active position above.

Simultaneously, the switching gear 128 is driven where the small gear 128*a* and the large gear 126*b* of the branch gear 126 are engaged. The switching gear 128 is moved upward as shown in FIG. 21(*b*). The driving pin 128*c* of the switching gear 128 and the cam grooves 131*a* of the Geneva gear 131 have gaps above and below and are disengaged from each other. Thus, even when the switching gear 128 rotates, the Geneva gear 131 remains stopped without being rotated. Therefore, the elevating driving gear 132, which is engaged with the Geneva gear 131, and the rack 71*c* of the left elevating rack 71 in the elevating unit 70, also remain stopped on the engaged part and thus the elevating unit 70 is not moved. Thus, the disk recording/reproducing section 60 is kept at the height of the tray 1 on the third stage to maintain the recording and reproduction of the disks 2*a* (2*b*).

At this point, since the cylindrical part 128*d* of the switching gear 128 and the circular arc cam 131*b* of the Geneva gear 131 maintain the engagement, the elevating unit 70 having the left elevating rack 71 engaged with the Geneva gear 131 via the elevating driving gear 132 is locked so as not to move even when vibration or impact is applied from the outside. Thus, the disk recording/reproducing section 60 similarly has no deviation.

Further, at this point, the tray lock lever 85 on each stage has the releasing protrusions 85*e*-1 to 85*e*-5 which are engaged with the cams 82*f*-1 to 82*f*-5 of the select rack 82 and rotate in the direction of arrow F (FIG. 13). Thus, the lock cam 85*b* and the recessed portion 1*h* are not engaged with each other and thus all the trays 1 can move in the forward and backward directions.

Subsequently, since the horizontal drive motor 103 of the driving mechanism 100 rotates in CCW (FIG. 19), the main gear 102 rotates in the direction of arrow L (FIG. 19) from the state of FIG. 230 via the decelerating mechanism and the driving gear 109. Then, the lock cam 102*g* presses the pin 119*c* and rotates the step-up lock lever 119 in the direction of arrow H (FIG. 19) which is opposite from the enegization of the spring part 119*d*. Thus, the cam 119*b* and the lock cam 110*c* of the step-up gear 110 are disengaged from each other and the step-up gear 110 can rotate.

Then, the gear 102*e* of the main gear 102 is engaged with the small gear 111*a* of the inverting gear 111 where the small gear 110*a* of the step-up gear 110 and the large gear 111*b* are constantly engaged with each other, and the inverting gear 111 and the step-up gear 110 are rotated. Thus, the tray driving gear 92 of the tray driving unit 90 is rotated via the relay mechanism. Then, only the tray gear 41 on the first stage (the lowest stage) firstly rotates that is engaged via the cam 41*c* with the driving cam 92*c* formed on the tray driving gear 92, and only the tray 1 on the first stage (the lowest stage) that is engaged with the gear 41*b* of the tray gear 41 via the rack 1*d* starts moving from the standby position Y to the attaching/detaching position X. Besides, although the load gear 43 rotates at the same time, interference does not occur because the load gear 43 is disengaged from the tray 1 on the third stage at the recording/reproducing position Z.

At this point, since the step-up gear 110 is driven by the main gear 102 via the inverting gear 111, the tray 1 moves forward despite of the rotation of the main gear 102 in the direction of arrow L (FIG. 19 or 25).

At this point, since the driving cam 102*h* of the main gear 102 does not change from the downward direction, the switching gear 128 stays upward as shown in FIG. 21(*b*). Although the driving pin 128*c* of the switching gear 128 and the cam grooves 131*a* of the Geneva gear 131 are not engaged with each other, the cylindrical part 128*d* of the switching gear 128 and the circular arc cam 131*b* of the Geneva gear, 131 maintain the engagement.

Then, when the tray driving gear 92, that is, the driving cam 92*c* on the first stage (the lowest stage) rotates 240° (360°−60°×2), the protrusion 92*d* formed on a part of the contacted surfaces of the tray driving gear 92 drives the protrusion 94*b* of the adjacent third tray driving cam 94. Thus, the third tray driving cam 94 on the second stage is rotated subsequently.

Then, the tray gear 41 on the second stage is rotated that is engaged via the cam 41*c* with the driving cam 94*a* formed on the third tray driving cam 94. The tray 1 on the second stage that is engaged with the gear 41*b* of the tray gear 41 via the rack 1*d* also starts moving from the standby position Y to the attaching/detaching position X. Subsequently, when the third tray driving cam 94 on the second stage rotates 240° (360°−60°×2), the third tray driving cam 94 on the third stage and the tray gear 41 on the third stage are similarly rotated.

However, since the tray 1 on the third stage is on the recording/reproducing position Z, the tray 1 is disengaged from the tray gear 41 and is not moved. Subsequently, when the third tray driving cam 94 on the third stage rotates 240° (360°−60°×2), the third tray driving cam 94 on the fourth stage and the tray gear 41 on the fourth stage rotate similarly, and the tray 1 on the fourth stage starts moving from the standby position Y to the attaching/detaching position X. Thereafter, all the trays 1 are similarly moved to the attaching/detaching position X.

Then, when the stock cam 102i of the main gear 102 presses and turns on the switch 133, the movement is stopped [the state of W in FIG. 27(b)]. At this point, the tray 1 on the second stage starts moving after the tray 1 on the first stage (the lowest stage), and the tray 1 on the fourth stage starts moving after the tray ion the second stage (the lowest stage) Hence, the trays 1 are arranged like steps as shown by all open of ALL OPEN3(f-3) in FIG. 2(f).

Therefore, except for the recorded or reproduced disk 2a (2b) on the tray 1, when the all the other trays 1 are moved from the standby position Y to the attaching/detaching position X, except for the recorded or reproduced disk 2a (2b), the principal surfaces of all the disk 2a (2b) are partially exposed, and thus it is possible to directly perform visual confirmation on which tray 1 has the disk 2a (2b) or which tray 1 has which disk 2a (2b).

Thereafter, when an instruction is provided for returning the stepped trays 1 to the original [DISC3(c-3) of FIG. 2©], the horizontal drive motor 103 of the driving mechanism 100 rotates oppositely from the direction of moving the trays 1 from the standby position Y to the attaching/detaching position X, that is, in CCW direction (FIG. 19). Thus, the main gear 102 rotates in the direction of arrow L (FIG. 19) via the decelerating mechanism and the driving gear 109, so that the tray driving gear 92 of the tray driving unit 90 is rotated backward via the relay mechanism.

Then, only the tray gear 41 on the first stage (the lowest stage) that is engaged with the tray driving gear 92 is firstly rotated backward, and only the tray 1 on the first stage (the lowest stage) that is engaged with the tray gear 41 starts moving from the attaching/detaching position X to the standby position Y. Then, when the tray driving gear 92 rotates 240° (360°−60°×2), the protrusion 92d formed on a part of the contacted surfaces of the tray driving gear 92 drives the protrusion 94b of the adjacent third tray driving cam 94. Thus, the third tray driving cam 94 on the second stage is rotated backward.

Then, the tray gear 41 on the second stage that is engaged with the third tray driving cam 94 is rotated backward in an integral manner, and the tray 1 on the second stage that is engaged with the tray gear 41 also starts moving from the attaching/detaching position X to the standby position Y. Subsequently, when the third tray driving cam 94 on the second stage rotates 240° (360°−60°×2), similarly the third tray driving cam 94 on the third stage and the tray gear 41 on the third stage are rotated backward. However, since the tray 1 on the third stage is on the recording/reproducing position the tray 1 is disengaged from the, tray gear 41 and is not moved. Subsequently, when the third tray driving cam 94 on the third stage rotates 240° (360°−60°×2), the third tray driving cam 94 on the fourth stage and the tray gear 41 on the fourth stage similarly rotate backward, and the tray 1 on the fourth stage starts moving from the attaching/detaching position X to the standby position Y. Thereafter, all the trays 1 are similarly moved to the standby position Y and thus the trays 1 are returned to the standby position Y and stopped thereon as indicated by DISC3(c-3) of FIG. 2©.

Then, the step-up lock lever 119 and the main gear 102 also return to the state of FIG. 26(a), and the main gear 102 and the inverting gear 111 are disengaged from each other. Subsequently, the elevation driving motor 120 of the driving mechanism 100 rotate in CW direction (FIG. 19) which is opposite from the above direction. The select rack 82 is moved to the rear and the tray driving unit 90 is moved downward by the similar operation in the opposite direction and thus the state returns to that of DISK3 (c-3) in FIG. 2(c).

As described above, according to the above embodiment, as to the invention described in claim 1, the tray transfer unit 50 is provided for shuttling the five trays 1 between the standby position Y for storing the disks 2a and 2b in a device and the recording/reproducing position Z for holding the disks 2a and 2b on the turntable 66a and performing recording or reproduction, and between the standby position Y and the attaching/detaching position X for protruding the trays 1 to the outside of the device to attach and detach the disks 2a and 2b. The trays 1 are each loaded with the disk 2a or 2b, can be moved in the forward and backward directions in parallel with the main surfaces of the disks 2a and 2b, and are stacked in a vertical direction which is at a right angle to the main surfaces of the disks 2a and 2b. The tray transfer unit 50 can switch the operation for moving the trays 1 one by one from the standby position Y to the attaching/detaching position X and the operation for moving all the trays from the standby position Y to the attaching/detaching position X and arranging the trays 1 like steps at the attaching/detaching position X.

The tray transfer unit 50 is switched to an separately-moving operation and is driven, so that the trays 1 are moved one by one from the standby position Y to the attaching/detaching position X. Furthermore, the tray transfer unit 50 is switched to an all-at-once operation and is driven, so that the trays 1 are arranged like steps, that is, the trays 1 are protruded to the attaching/detaching position X while the main surfaces of all the disks 2a and 2b are partially exposed. Hence, with a simple operation in a short time, it is possible to directly and visually confirm which tray 1 has the disk 2a (2b) or which tray 1 has which disk 2a (2b) in the device.

Further, as to the invention of claim 2, the tray transfer unit 50 is provided for shuttling the five trays 1 between the standby position Y for storing the disks 2a and 2b in a device and the recording/reproducing position Z for holding the disks 2a and 2b on the turntable 66a and performing recording or reproduction, and between the standby position Y and the attaching/detaching position X for protruding the trays 1 to the outside of the device to attach and detach the disks 2a and 2b. The trays 1 are each loaded with the disk. 2a or 2b, can be moved in the forward and backward directions in parallel with the main surfaces of the disks 2a and 2b, and are stacked in a vertical direction which is perpendicular to the main surfaces of the disks 2a and 2b. The tray transfer unit 50 can switch the operation for moving the trays 1 one by one from the standby position Y to the attaching/detaching position X and the operation for moving all the trays other than the recorded or reproduced tray 1 from the standby position Y to the attaching/detaching position X and arranging the trays 1 like steps at the attaching/detaching position X.

Thus, the tray transfer unit 50 is switched to a separately-moving operation and is driven, so that the trays 1 are moved one by one from the standby position Y to the attaching/detaching position X. Further, the tray transfer unit 50 is switched to an all-at-once operation and is driven during recording and reproduction, so that the trays 1 are arranged like steps, that is, the trays 1 are protruded to the attaching/detaching position X while the main surfaces of all the disks 2a and 2b other than the recorded or reproduced disks 2a and 2b are partially exposed. Hence, with a simple operation in a short time, it is possible to directly and visually confirm which tray 1 has the disk 2a (2b) or which tray 1 has which disk 2a (2b) except for the recorded or reproduced disks 2a and 2b in the device.

Moreover, as to the invention of claim 3, the tray transfer unit 50 is provided for shuttling the five trays 1 between the standby position Y for storing the disks 2a and 2b in a device and the recording/reproducing position Z for holding the disks 2a and 2b on the turntable 66a and performing recording or reproduction, and between the standby position Y and the attaching/detaching position X for protruding the trays 1 to the outside of the device to attach and detach the disks 2a and 2b. The trays 1 are each loaded with the disk 2a or 2b, can be moved in the forward and backward directions in parallel with the main surfaces of the disks 2a and 2b, and are stacked in a vertical direction which is perpendicular to the main surfaces of the disks 2a and 2b. The tray transfer unit 50 comprises the tray gear unit 40 separately engaged with the trays 1, and the tray driving unit 90, for separately driving the trays 1 via the tray gear unit 40. The tray gear unit 40 has the five tray gears 41 which are stacked uniaxially so as to be engaged with the trays 1, respectively. The tray driving unit 90 is located in a laminated manner uniaxially as the tray gears 41 on the inner diameter part of the cylindrical part 41a of the tray gear 41, and the tray driving unit 90 has the tray driving gear 92 engaged with each of the tray gears 41, the three third tray driving cams 94, the second tray driving cam 95, and the first tray driving cam 96. The protrusions 92d, 94b, and 95b are formed partially on the contacted surfaces of these gear and cams. The tray driving gear 92 where the protrusions 92d, 94b, and 95b are adjacent, the three third tray driving cams 94, and the protrusions 92d, 94b, and 95b of the second tray driving cam 95 are successively driven in an intermittent manner.

Hence, the trays 1 are moved one by one from the standby position Y to the attaching/detaching position X via the tray gear unit 40 engaged separately with the trays 1. To be specific, when the tray driving gear 92 is driven on the first stage which is the lowest stage located in a laminated manner, only the engaged tray gear 41 on the first stage is rotated, and only the tray 1 engaged with the tray gear 41 on the first stage starts moving from the standby position Y to the attaching/detaching position X. When the tray driving gear 92 on the first stage rotates 240° (360°−60°×2), the protrusion 92d of the tray driving gear 92 drives the protrusion 94b of the adjacent third tray driving cam 94. Thus, the third tray driving cam 94 on the second stage is subsequently rotated, the engaged tray gear 41 on the second stage is rotated, and the tray 1 on the second stage that is engaged with the tray gear 41 also starts moving from the standby position Y to the attaching/detaching position X. Subsequently, when the third tray driving cam 94 on the second stage rotates 240° (360°−60°×2), the third tray driving cam 94 or the third stage and the tray gear 41 on the third stage are similarly rotated, and the tray 1 on the third stage also starts moving from the standby position Y to the attaching/detaching position X. Thereafter, all the trays 1 are similarly moved to the attaching/detaching position X. At this point, with delay of a 240° rotation angle of the tray gear 41, the tray 1 on the second stage starts the movement after the tray 1 on the first stage, and the tray, 1 on the third stage starts the movement after the tray 1 on the second stage. Thus, the trays 1 are arranged like steps, that is, the trays 1 are protruded to the attaching/detaching position X while the main surfaces of all the disks 2a and 2b are partially exposed. Hence, with a simple operation in a short time, it is possible to directly and visually confirm which tray 1 has the disk 2a (2b) or which tray 1 has which disk 2a (2b).

Further, as to the invention of claim 4, the cams 41c are provided on the inner diameter parts of the cylindrical parts 41a of the five tray gears 41 in the tray gear unit 40. The driving cams 92c, 94a, 95a, and 96a are provided on the outer diameter parts of the tray driving gear 92, the three third tray driving cams 94, the second tray driving cam 95, and the first tray driving cam 96 in the driving unit 90. These cams 41c can be engaged with the driving cams 92c, 94a, 95a, and 96a, so that rotational drive can be transmitted.

Moreover, as to the invention of claim 5, the concave portion 41e is formed on the cam 41c with respect to the direction of rotation, and the recessed portions 92f, 94d, 95d, and 96c are formed on the driving cams 92c, 94a, 95a, and 96a with respect to the direction of rotation. Thus, even when the cams 41c of the tray gear 41 are slightly deviated in height with respect to the tray driving gear 92, the three third tray driving cams 94, the second tray driving cam 95, and the driving cams 92c, 94a, 95a, and 96a of the first tray driving cam 96, induced correction can be made by the corresponding protruded portions 41e and the recessed portions 92f, 94d, 95d, and 96c, thereby achieving stable transmission of rotational drive.

Besides, as to the invention of claim 6, the tray driving unit 90 can be switched to a single transfer attitude in which the first, tray driving cam 96 is engaged with one tray gear 41 of the tray gear unit 40 after selection and a plural transfer attitude in which the tray driving gear 92, the three third tray driving cams 94, and the second tray driving cam 95 are engaged with the five tray gears 41 of the tray gear unit 40 after selection. The common tray driving unit 90 is used to selectively perform the operation of protruding the trays 1 separately (one by one) to the attaching/detaching position X and the operation of protruding all the trays 1 (plural), which are arranged like steps, to the attaching/detaching position X. Additionally, even in a state in which the disks 2a and 2b on one tray 1 are held on the turntable 66a and recording or reproduction is performed, except for the recorded or reproduced disks 2a and 2b and tray 1, the trays 1 are arranged like steps, that is, the trays 1 are protruded to the attaching/detaching position X while the main surfaces of all the disks 2a and 2b are partially exposed. Without interrupting recording or reproduction on the disks 2a and 2b, it is possible to directly and visually confirm which tray 1 has the disk 2a (2b) or which tray 1 has which disk 2a (2b) in the device with a simple operation in a short time.

Further, as to the invention of claim 7, the driving mechanism 100 comprises the horizontal motor 103 for driving the tray transfer unit 50 and the elevation driving motor 120 for driving the elevating unit 70 and the tray selecting unit 80. The connecting/disconnecting unit 140 is provided for connecting and disconnecting transmission in a transmission line from the elevation driving motor 120 to the elevating unit 70. The connecting/disconnecting unit 140 is driven by the switching lever 130 which operates in response to the rotation of the main gear 102 interlocked with the horizontal drive motor 103. Thus, when the disks 2a and 2b are stored in the device and are located on the standby position Y the connecting/disconnecting unit 140 is brought into a connecting state by the switching lever 130 which operates in response to the rotation of the main gear 102 interlocked with the horizontal drive motor 103 serving as the tray transfer unit 50. Hence, when the elevation driving motor 120 is driven, since the elevating unit 70 and the tray selecting unit 80 are driven at the same time, it is possible to simultaneously move the disk recording/reproducing section 60 vertically and to select the tray 1. Thereafter, the horizontal drive motor 103 is driven'to drive the tray transfer unit 50, so that trays 1 are shuttled between the standby position Y and the attaching/detaching position X and between the standby position Y and the recording/reproducing position Z, and it is possible to load or eject the disks 2a and 2b and exchange the recorded and reproduced disks 2a and 2b.

Further, when the disks 2a and 2b are located on the recording/reproducing position Z where the disks 2a and 2b are held on the turntable 66a for recording and reproduction, the connecting/disconnecting unit 140 is brought into a disconnecting state by the switching lever 130 which operates in response to the rotation of the main gear 102 interlocked with the horizontal drive motor 103 serving as the tray transfer unit 50. Hence, when the elevation driving motor 120 is driven, although the tray selecting unit 80 is driven to select the tray 1, the elevating unit 70 is not driven, the disk recording/reproducing section 60 is held at the same position without moving vertically, and thus recording or reproduction can be continued. In this state, the horizontal motor 103 is driven to drive the tray transfer unit 50 and the trays 1 are shuttled between the standby position Y and the attaching/detaching position X. Hence, without interrupting the recording or reproduction of the disks 2a and 2b, it is possible to load or eject the disks 2a and 2b on the trays 1 other than the recorded or reproduced tray 1. As described above, with a simple configuration and a stable operation, the tray transfer unit 50, the elevating unit 70, and the tray selecting unit 80 can be operated in a short time.

Moreover, as to the invention of claim 8, the connecting/disconnecting unit 140 comprises the Geneva gear 131 which is constantly interlocked with the elevating unit 70 and the switching gear 128 which is constantly interlocked with the elevation driving motor 120. The switching gear. 128 is configured so that engagement with the Geneva gear. 131 is disconnected by the switching lever 130 which operates in response to the rotation of the main gear 102. It is possible to disconnect engagement of the switching gear 128 with the Geneva gear 128 via the switching lever 130 which operates in response to the rotation of the main gear 102 serving as the tray transfer unit 50, thereby readily performing the disconnecting operation of the connecting/disconnecting unit 140 with stability in a short time.

Besides, as to the invention of claim 9, the connecting/disconnecting unit 140 disconnects engagement by vertically disengaging the driving pin 128c provided on the switching gear 128 from the cam grooves 131a formed on the Geneva gear 131. Thus, when the switching gear 128 serving as the connecting/disconnecting unit 140 is moved vertically by the switching lever 130 which operates in response to the rotation of the main gear 102, gaps are formed between the cylindrical part 128d of the switching gear 128 and the circular arc cam 131b of the Geneva gear 131, and the switching gear 128 and the Geneva gear 131 do not interfere with each other horizontally. Thus, the switching gear 128 can positively move in a vertical direction. Moreover, when the connecting/disconnecting unit 140 is in the connecting state, by rotating the switching gear 128, the driving, pin 128c of the switching gear 128 is engaged with the cam grooves 131a of the Geneva gear 131 to drive the Geneva gear 131 and rotate the Geneva gear 131 intermittently. Thus, it is possible to perform reliable driving and a stable disconnecting operation.

Moreover, as to the invention of claim 10, the connecting/disconnecting unit 140 is configured so that the engagement is maintained between the circular, arc cams 131b of the Geneva gear 131 and the cylindrical part 128d of the switching gear, 128 even when the driving pin 128 provided on the switching gear 128 is engaged with the cam grooves 131a formed on the Geneva gear 131 and even when the driving pin 128 provided on the switching gear 128 is vertically disengaged and the engagement is disconnected. Thus, when the operation is stopped, the engagement between the circular arc cams 131b of the Geneva gear 131 and the cylindrical part 128d of the switching gear is constantly maintained. Hence, the Geneva gear 131 is locked from the driven side so as not to be rotated. Thus, the elevating unit 70 is locked so as not to be moved even when a transmission line to the elevation driving motor 120 is disconnected. Since the elevating unit 70 is not moved even when vibration or impact is applied from the outside, resulting in no deviation in height of the disk recording/reproducing section 60.

Also, as to the invention of claim 11, since the cam groove 131a of the Geneva gear 131 has the chamfered part 131d so that the cam groove 131a increases in width as it is closer to the end 131c. As compared with the absence of the chamfered parts 131d on the cam groove 131a, it is possible to reduce a radius from the rotational center of the driving pin 128c, of the switching gear 128. Hence, it is possible to lower a reduction ratio of the Geneva gear 131 and the switching gear 128, to reduce fluctuations in load, and to reduce impact when the Geneva gear 131 is rotated intermittently Additionally, as to the invention of claim 12, since the circular arc cams 131b of the Geneva gear. 131 are formed so that the ends spread wider than the arc. As compared with the case where both ends of the circular arc cams 131b do not spread wider than the arc, gaps are obtained between both ends of the circular arc cams 131b of the Geneva gear 131 and the cylindrical part 128d of the switching gear, 128. Thus, in the case where the switching gear 128 serving as the connecting/disconnecting unit 140 is vertically moved, even when the rotation stopping position of the switching gear 128 is slightly shifted, the cylindrical part 128d and the recessed portion 128d of the switching gear 128 and both ends of the circular arc cams 131b of the Geneva gear 131 do not interfere with each other.

Besides, in the embodiment, the protrusions 92d, 94b, and 95b are 60° in width taken from the top. The protrusions 92d, 94b, and 95b are provided partially on the contacted surfaces of the tray driving gear 92, the three third tray driving cams 94, and the second tray driving cam 95 of the tray driving unit 90. By increasing or reducing the widths (angles), it is possible to readily adjust a protrusion difference between the trays 1 when the trays 1 are protruded to the attaching/detaching position X while being arranged like steps.

Further, in the present embodiment, lamination is provided such that the interval (3 mm) between the driving cam 96a of the first tray driving cam 96 on the highest stage and the driving cam 95a of the second tray driving cam 95 is smaller than the interval (6 mm) of the other driving cams. Thus, when the driving cam 96a on the highest stage is engaged with the driving cam 95a, the other driving cams are not engaged with the other tray driving cams. The same function can be achieved when lamination is provided such that the interval (3 mm) between the driving cam of the tray driving cam on the lowest stage and the second tray driving cam from the bottom is smaller than the interval (6 mm) between the other driving cams.

What is claimed is:

1. A disk changer for storing a plurality of disks, transporting a disk selected from the plurality of disks, and performing recording and reproduction of the disk, the disk changer, comprising:
- a plurality of trays which are each respectively capable of being loaded with a disk, the trays can be moved substantially in a horizontal direction being in parallel with a main surface of a disk, and are stacked substantially in a vertical direction at a right angle to a main surface of a disk,
- a disk recording/reproducing section for holding a disk on a turntable and performing recording or reproduction, and
- a tray transfer unit for shuttling the trays between a standby position for storing a disk in a device and an attaching/detaching position for protruding the trays to the outside of the device to attach and detach a disk, and between the standby position and a recording/reproducing position for recording and reproducing a disk,
- an elevating unit for moving a disk recording/reproducing section substantially in a vertical direction and setting the section at a height of a selected disk,
- a tray selecting unit which is similarly moved substantially in a vertical direction and selects a tray loaded with a selected disk, and
- a driving mechanism for driving the tray transfer unit, the elevating unit, and the tray selecting unit,
- wherein the tray transfer unit comprises a tray gear unit separately engaged with the trays, and a tray driving unit for separately driving the trays via the tray gear unit, the tray gear unit having a plurality of tray gears located uniaxially in a laminated manner to be respectively engaged with the trays, the tray driving unit being located in an inner diameter part of the tray gears in a laminated manner uniaxially with the tray gears and having a plurality of tray driving cams respectively engaged with the tray gears and for driving the tray gears, each tray driving cam having an engageable protrusion formed on a contact surface thereof with a surface of an adjacent tray driving cam, a protrusion on a tray driving cam of one tray being engaged with a protrusion on a tray driving cam of an adjacent tray when the tray driving cam is driven, so that the driving start time of the tray driving cam of a next to lowest tray is delayed relative to the driving start time of the tray driving cam of a lowest tray, thereby each tray driving gear is rotatably driven in sequence.

2. The disk changer according to claim 1, further comprising a cam on an inner diameter part of the tray gear, and a driving cam on an outer diameter part of the tray driving cam, wherein the cam can be engaged with the driving cam.

3. The disk changer according to claim 2, wherein a protruded portion and a recessed portion are formed on the cam and the driving cam with respect to a rotating direction.

4. The disk changer according to claim 2, wherein an interval between the driving cam on a highest stage or a lowest stage and a driving cam on a subsequent stage is smaller than an interval between the other driving cams, so that when the driving cam on the highest stage or the lowest stage is engaged with the tray driving cam, the other driving cams are not engaged with the other tray driving cams.

5. The disk changer according to claim 1, wherein the driving mechanism comprises a horizontal motor for driving the tray transfer unit, an elevation driving motor for driving the elevating unit and the tray selecting unit, and a connecting/disconnecting unit for connecting and disconnecting transmission along a transmission line from the elevation driving motor to the elevating unit, the connecting/disconnecting unit being driven by a switching lever operating in response to rotation of a main gear interlocked with the horizontal drive motor.

6. The disk changer according to claim 5, wherein the connecting/disconnecting unit comprises a Geneva gear constantly interlocked with the elevating unit and a switching gear constantly interlocked with the elevation driving motor, the switching gear being shifted to disconnect engagement thereof with the Geneva gear by using the switching lever.

7. The disk changer according to claim 6, wherein the connecting/disconnecting unit disconnects engagement of the switching gear with a cam groove formed on the Geneva gear, by vertically disengaging a driving pin formed on the switching gear.

8. The disk changer according to claim 7, wherein the connecting/disconnecting unit maintains engagement between a circular arc cam of the Geneva gear and a cylindrical part of the switching gear even when the driving pin is engaged with the cam groove and even when the driving pin is vertically disengaged to disconnect the engagement.

9. The disk changer according to claim 8, wherein the circular arc cam is formed so that opposite ends thereof spread wider than an arc thereof.

10. The disk changer according to claim 7, wherein the cam groove is chamfered to increase in width toward an end thereof.

* * * * *